(12) United States Patent
Baxter et al.

(10) Patent No.: US 7,225,278 B1
(45) Date of Patent: May 29, 2007

(54) METHOD AND APPARATUS FOR CONTROLLING DIRECT ACCESS TO MEMORY CIRCUITRY

(75) Inventors: Glenn A. Baxter, Los Gatos, CA (US); Christopher J. Borrelli, Campbell, CA (US)

(73) Assignee: Xilinx, Inc., San Jose, CA (US)

( * ) Notice: Subject to any disclaimer, the term of this patent is extended or adjusted under 35 U.S.C. 154(b) by 477 days.

(21) Appl. No.: 10/824,713

(22) Filed: Apr. 15, 2004

(51) Int. Cl.
*G06F 13/28* (2006.01)
*G06F 13/00* (2006.01)

(52) U.S. Cl. .......................... 710/22; 710/33; 710/308

(58) Field of Classification Search ............ 710/22–28, 710/308–310; 711/208
See application file for complete search history.

(56) References Cited

U.S. PATENT DOCUMENTS

| | | | |
|---|---|---|---|
| 4,912,632 A | 3/1990 | Gach et al. | |
| 5,239,629 A | 8/1993 | Miller et al. | |
| 5,644,784 A * | 7/1997 | Peek ........................... | 710/24 |
| 5,765,036 A | 6/1998 | Lin | |
| 6,108,737 A | 8/2000 | Sharma et al. | |
| 6,161,168 A | 12/2000 | Kametani | |
| 6,212,593 B1 * | 4/2001 | Pham et al. ................ | 710/266 |
| 6,314,499 B1 | 11/2001 | Kermani | |
| 6,784,465 B2 * | 8/2004 | Roy ........................... | 257/107 |
| 2005/0044283 A1 * | 2/2005 | Muro ........................... | 710/8 |

OTHER PUBLICATIONS

U.S. Appl. No. 10/824,715, filed Apr. 15, 2004, Borrelli et al.
U.S. Appl. No. 10/824,967, filed Apr. 15, 2004, Baxter et al.
Xilinx, Inc.; DS230, LogiCore; LocalLink Interface; Interface Specification; Oct. 18, 2002; available from Xilinx, Inc., 2100 Logic Drive, San Jose, California 95124; pp. 1-17.

* cited by examiner

*Primary Examiner*—Christopher Shin
(74) *Attorney, Agent, or Firm*—Robert Brush

(57) ABSTRACT

Method and apparatus for controlling direct access to memory circuitry by a device is described. In one example, a streaming interface is configured to transmit and receive a communication sequence to and from the device. Control logic is configured to implement a plurality of direct memory access (DMA) engines. The DMA engines are configured to read and write data to and from the memory circuitry. A set of registers is configured to store control data for the plurality of DMA engines.

36 Claims, 18 Drawing Sheets

| | TS1 | TS2 | TS3 | | | TS4 | | |
|---|---|---|---|---|---|---|---|---|
| | | | TS3A | P2 | TS3B | TS4A | P3 | TS4B |
| PR1 | P0 | P1 | P0 | | P1 | P0 | | P1 |
| PR2 | P1 | P0 | P1 | | P0 | P1 | | P0 |
| PR3 | ///  | /// | P0 | | P1 | P1 | | P0 |

METHOD AND APPARATUS FOR CONTROLLING DIRECT ACCESS TO MEMORY CIRCUITRY

FIELD OF THE INVENTION

One or more aspects of the present invention relate generally to a memory controller and, more particularly, to a method and apparatus for controlling direct access to memory circuitry.

BACKGROUND OF THE INVENTION

A conventional computing system includes a central processing unit (CPU), a memory, and one or more peripheral devices. The CPU executes software instructions to cause the computing system to perform a particular function. The memory stores data and instructions for the computing system. The peripheral devices generally express output signals of, or provide input signals to, the computing system. Examples of peripheral devices include graphics cards, keyboard interfaces, and network interface cards (NICs). The computing system includes a system bus to facilitate communication among the CPU, the memory, and the peripheral devices. The system bus is also referred to as a "shared bus," since the system bus is shared among multiple components of the computing system.

In a conventional computing system, components access the memory using the system bus. That is, the system bus is used to communicate data between the components and the memory. Since multiple components may attempt to access the bus simultaneously, the bus must perform arbitration. However, on a shared bus, arbitration is a serial process. That is, a component must request bus access, be granted bus access to the exclusion of all other components, and then perform a memory transaction. The bus arbitration "overhead" results in substantial latency in performing memory transactions. In addition, such overhead may not allow the full bandwidth capabilities of the memory to be utilized, since the memory is not being kept busy during the time when components are requesting and receiving access to the system bus. Accordingly, there exists a need in the art for high bandwidth memory access.

SUMMARY OF THE INVENTION

Method and apparatus for controlling direct access to memory circuitry by a device is described. In one embodiment, a streaming interface is configured to transmit and receive a communication sequence to and from the device. Control logic is configured to implement a plurality of direct memory access (DMA) engines. The DMA engines are configured to read and write data to and from the memory circuitry. A set of registers is configured to store control data for the plurality of DMA engines.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIG. 4 depicts an exemplary embodiment of an arbitration table for use with arbitration logic of the MPMC of FIG. 3;

DETAILED DESCRIPTION OF THE DRAWINGS

To facilitate understanding of the invention, the description has been organized as follows:

Overview, introduces aspects of the invention and exemplary embodiments of their relationships to one another;

Data Communication System, describes an exemplary system for providing Gigabit Ethernet communication between a source/sink device and a network;

Multi-port Memory Controller, describes a memory controller for double data rate memory having built-in arbitration and direct memory access (DMA) capabilities;

Communication DMA controller, describes an intelligent DMA controller; and

Gigabit Ethernet MAC, describes an intelligent MAC for controlling Gigabit Ethernet communication.

Overview

One or more aspects of the invention are described with respect to a data processing system having a memory controlling that provides high-bandwidth memory access. In one embodiment of the invention, the data communication system provides an interface between a source/sink device (e.g., a camera) and a Gigabit Ethernet network. To enable such high data-rate communications (e.g., 1200 megabits per second full duplex), a multi-port memory controller (MPMC) is provided having built-in arbitration logic and an operatively coupled intelligent communication direct memory access controller (CDMAC). The MPMC may include any number of ports, each of which may be configured with any type of interface. For example, the MPMC may include a port for communicating directly with a central processing unit (CPU) (e.g., an instruction-side processor local bus) and/or a port for communicating with a system bus.

A plurality of the MPMC ports may be coupled to the CDMAC, where each port is configured to communicate with a device over a non-shared interface (e.g., a streaming interface). To facilitate Gigabit Ethernet communication, a Gigabit Ethernet media access controller (GEMAC) is provided having a streaming interface for communicating with the CDMAC to provide direct memory access. The GEMAC may include transmission control protocol (TCP/IP) checksum offload capabilities, which increases the effective bandwidth of the CPU.

Figure 1:
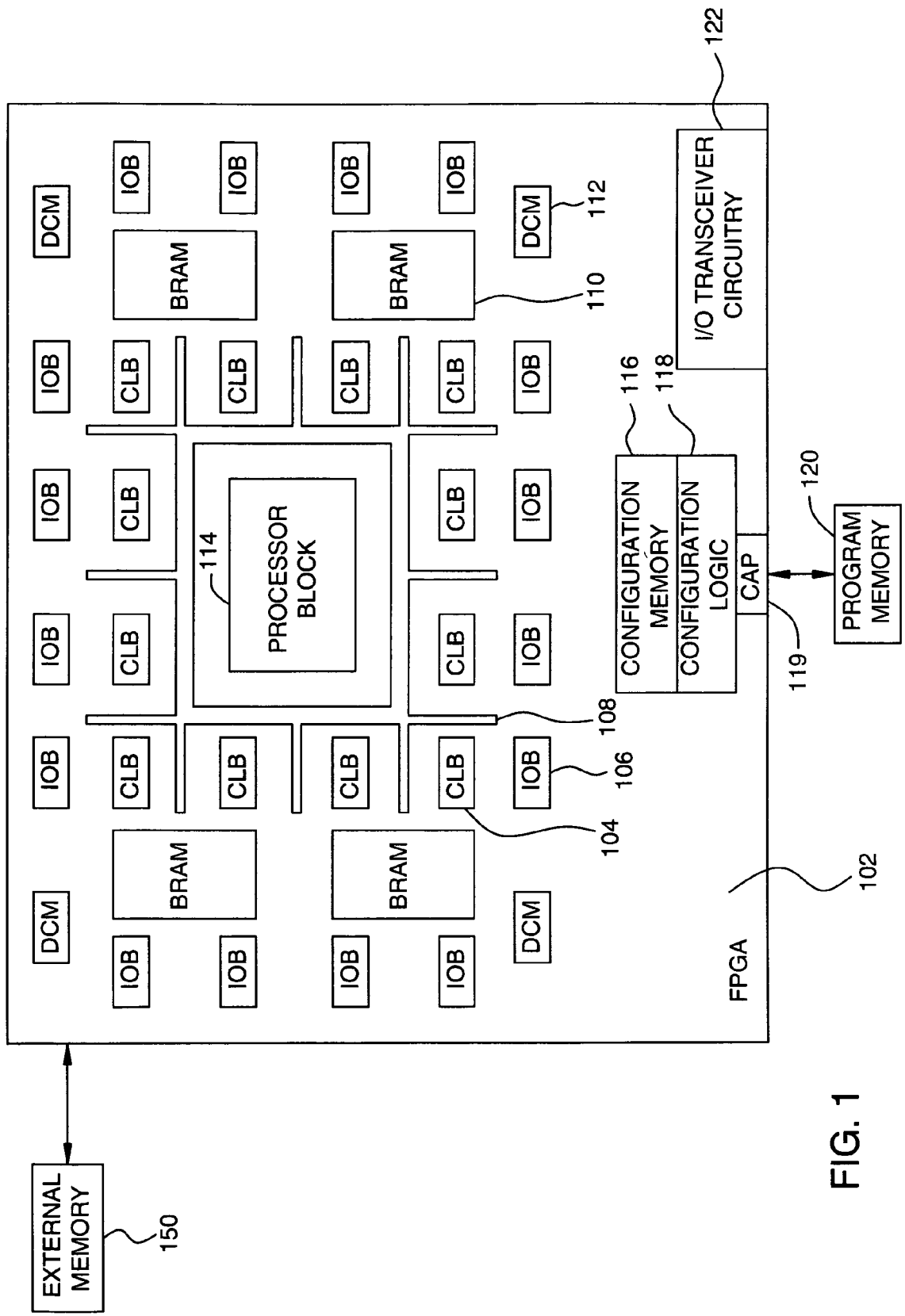
FIG. 1 is a block diagram depicting an exemplary embodiment of an FPGA coupled to external memory and a program memory.

One or more aspects of the invention may be implemented using a programmable logic device, such as a field programmable gate array (FPGA). Notably, FIG. 1 is a block diagram depicting an exemplary embodiment of an FPGA 102 coupled to external memory 150 and a program memory 120. The external memory 150 may comprise random access memory (RAM). For purposes of clarity by example, the memory 150 is referred to as "external" in that the memory 150 is not part of the FGPA 102. It is to be understood, however, that the external memory 150 and the FPGA 102, as well as various other devices, may be integrated onto a single chip to form a single system-level integrated circuit (referred to as a "system-on-a-chip" or SoC).

The FPGA 102 illustratively comprises programmable logic circuits or "blocks", illustratively shown as CLBs 104, IOBs 106, and programmable interconnect 108 (also referred to as "programmable logic"), as well as configuration memory 116 for determining the functionality of the FPGA 102. The FPGA 102 may also include an embedded processor block 114, as well as various dedicated internal logic circuits, illustratively shown as blocks of random access memory ("BRAM 110"), configuration logic 118, digital clock management (DCM) blocks 112, and input/output (I/O) transceiver circuitry 122. Those skilled in the art will appreciate that the FPGA 102 may include other types of logic blocks and circuits in addition to those described herein.

As is well known in the art, the IOBs 106, the CLBs 104, and the programmable interconnect 108 may be configured to perform a variety of functions. Notably, the CLBs 104 are programmably connectable to each other, and to the IOBs 106, via the programmable interconnect 108. Each of the CLBs 104 may include one or more "slices" and programmable interconnect circuitry (not shown). Each CLB slice in turn includes various circuits, such as flip-flops, function generators (e.g., a look-up tables (LUTs)), logic gates, memory, and like type well-known circuits. The IOBs 106 are configured to provide input to, and receive output from, the CLBs 104.

Configuration information for the CLBs 104, the IOBs 106, and the programmable interconnect 108 is stored in the configuration memory 116. The configuration memory 116 may include static random access memory (SRAM) cells. The configuration logic 118 provides an interface to, and controls configuration of, the configuration memory 116. A configuration bitstream produced from the program memory 120 may be coupled to the configuration logic 118 through a configuration port 119. The configuration process of FPGA 102 is also well known in the art.

The I/O transceiver circuitry 122 may be configured for communication over any of a variety of media, such as wired, wireless, and photonic, whether analog or digital. The I/O transceiver circuitry 122 may comprise gigabit or multi-gigabit transceivers (MGTs). The DCM blocks 112 provide well-known clock management circuits for managing clock signals within the FPGA 102, such as delay lock loop (DLL) circuits and multiply/divide/de-skew clock circuits.

The processor block 114 comprises a microprocessor core, as well as associated control logic. Notably, such a microprocessor core may include embedded hardware or embedded firmware or a combination thereof for a "hard" or "soft" microprocessor. A soft microprocessor may be implemented using the programmable logic of the FPGA 102 (e.g., CLBs 104, IOBs 106). For example, a MICROBLAZE soft microprocessor, available from Xilinx, Inc. of San Jose, Calif., may be employed. A hard microprocessor may be implemented using an IBM POWER PC, Intel PENTIUM, AMD ATHLON, or like type processor core known in the art.

The processor block 114 is coupled to the programmable logic of the FPGA 102 in a well known manner. For purposes of clarity by example, the FPGA 102 is illustrated with 12 CLBs, 16 IOBs, 4 BRAMs, 4 DCMs, and one processor block. Those skilled in the art will appreciate that actual FPGAs may include one or more of such components in any number of different ratios. For example, the FPGA 102 may be selected from the VIRTEX-II PRO family of products, commercially available from Xilinx, Inc. of San Jose, Calif.

While aspects of the invention are described with specific reference to an FPGA, those skilled in the art will appreciate that some embodiments the invention may be used with other types of integrated circuits (ICs), such as complex programmable logic devices (CPLDs) or other ICs having programmable functions and/or programmable interconnects. In addition, one or more portions of embodiments of the present invention may be implemented in hardwired application specific circuits on an IC having programmable functions or in one or more application specific integrated circuits (ASICs).

Data Communication System

Figure 2:
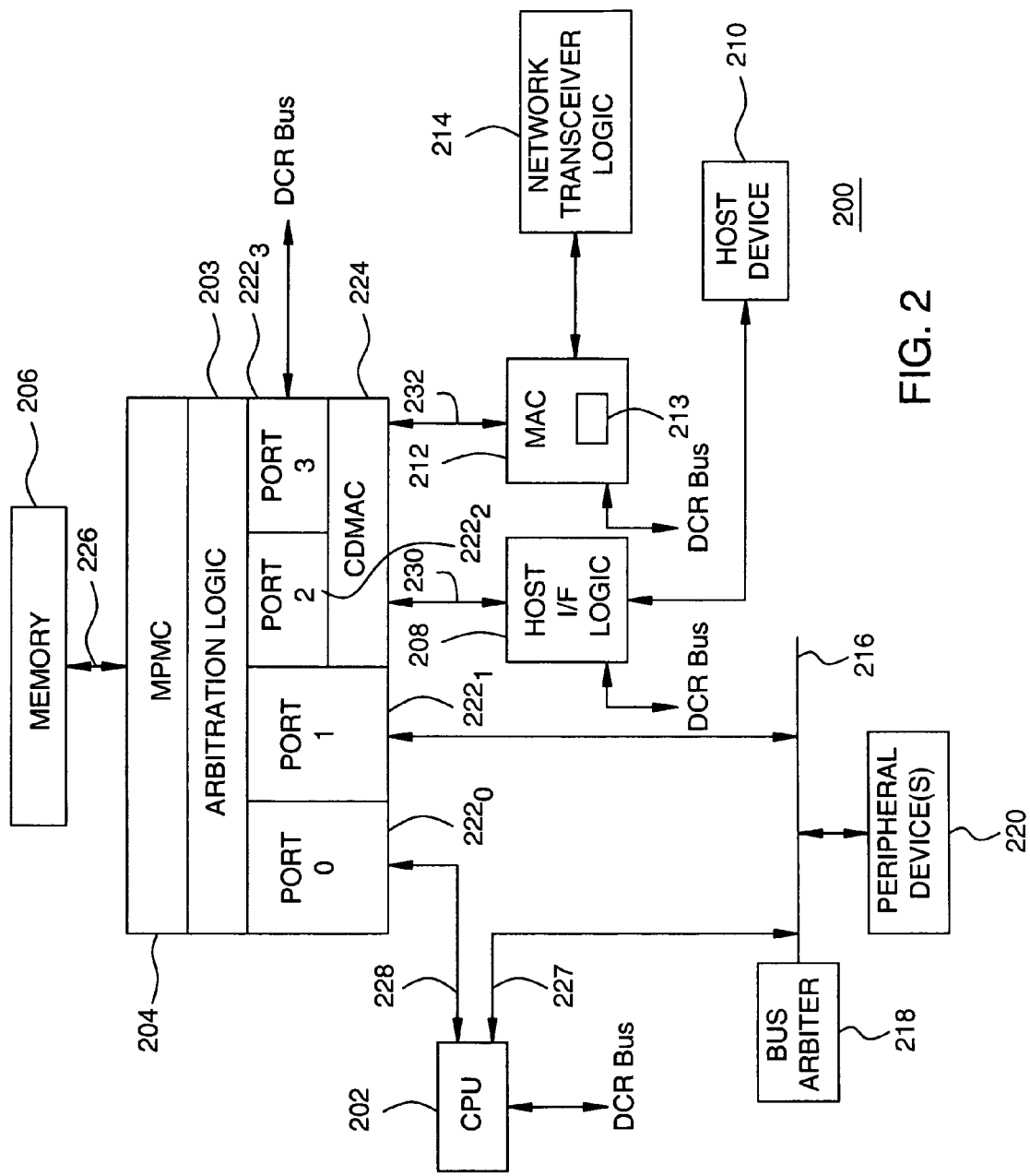
FIG. 2 is a block diagram depicting an exemplary embodiment of a data processing system constructed in accordance with one or more aspects of the invention.

FIG. 2 is a block diagram depicting an exemplary embodiment of a data processing system 200 constructed in accordance with one or more aspects of the invention. The data processing system 200 comprises a central processing unit (CPU) 202, a memory controller 204, a memory 206, host interface logic 208, a host device 210, a media access controller (MAC) 212, network transceiver logic 214, a bus 216, a bus arbiter 218, and one or more peripheral devices 220. The memory controller 204 includes ports $222_0$ through $222_3$ (collectively referred to as ports 222), a communication direct memory access controller (CDMAC) 224, arbitration logic 203, and a memory interface 226. The memory controller 204 may also be referred to herein as a multi-port memory controller (MPMC). The CPU 202 may control the host interface logic 208, the MAC 212, and the CDMAC 224 through a device control register (DCR) bus.

The memory interface 226 is coupled to the memory 206. In one embodiment, the memory 206 comprises a high-speed memory, such as DDR RAM (e.g., DDR SDRAM), QDR SRAM, ZBT SRAM, and the like. For purposes of clarity by example, aspects of the invention are described below with respect to a DDR SDRAM memory interface. The DDR SDRAM memory interface is well known in the art and the details of such interface are not described in detail herein. It is to be understood, however, that embodiments of the invention may be configured with respect to other types of memory interfaces depending on the particular type of memory used.

The port $222_0$ is coupled to a bus 228 of the CPU 202. The port $222_1$ is coupled to the bus 216. The CPU 202 includes a port 227 coupled to the bus 216. The peripheral devices 220 and the bus arbiter 218 are also coupled to the bus 216. The ports $222_2$ and $222_3$ are coupled to the CDMAC 224. The CDMAC 224 is coupled to the host interface logic 208 via an interface 230. The host interface logic 208 is configured for communication with the host device 210. The CDMAC 224 is coupled to the MAC 212 via an interface 232. The MAC 212 is configured for communication with the network transceiver logic 214. The peripheral devices 220 and the bus arbiter 218 are coupled to the bus 216.

The memory controller 204 controls access to the memory 206 among devices coupled to the ports 222, including the bus 216, the CPU 202, the host interface logic 208, and the MAC 212. The arbitration logic 203 arbitrates access to the memory 206 among the ports 222. Incorporating the arbitration logic 203 within the memory controller 204 maximizes bandwidth usage of the memory 206. An exemplary embodiment of an MPMC that may be used as the memory controller 204 is described below in the section entitled "MULTI-PORT MEMORY CONTROLLER."

In particular, the CPU 202 may access the memory 206 through the port $222_1$ via the port 227 and the bus 216. The peripheral devices 220 may access the memory 206 through the port $222_1$ via the bus 216. The bus arbiter 218 controls access to the bus 216 among the CPU 202 and the peripheral devices 220 in a well-known manner. For example, the bus 216 may comprise a CPU local bus (e.g., a processor local bus (PLB)).

The CPU 202 may also access the memory 206 directly through the port $222_0$ via the bus 228, without using the bus 216. For example, in one embodiment, the bus 228 may be an "instruction-side" bus of the CPU 202, and the port 227 may be a "data-side" bus of the CPU 202. The instruction-side bus (the bus 228) may be used to read software code stored in the memory 206. The data-side bus (the port 227) may be used to read and write data from and to the memory 206. For example, the CPU 202 may comprise an IBM PowerPC 405 processor from IBM Corp. of White Plains, N.Y., having an instruction-side processor local bus (ISPLB) and a data-side processor local bus (DSPLB).

The host device 210 may access the memory 206 through the CDMAC 224 via the host interface logic 208 and the interface 230. The network transceiver logic 214 may access the memory 206 through the CDMAC 224 via the MAC 212 and the interface 232. Notably, the CDMAC 224 is configured to access the memory 206 through the ports $222_2$ and $222_3$ using a direct memory access (DMA) process. Each of the interfaces 230 and 232 is a non-shared interface (also referred to as a "point-to-point" interface). In one embodiment of the invention, each of the interfaces 230 and 232 comprises a streaming interface, such as a LocalLink interface. The LocalLink interface is described in the LocalLink interface specification, DS230, published Oct. 18, 2002, by Xilinx, Inc., which is incorporated by reference herein in its entirety. An exemplary embodiment of a CDMAC that may be used as the CDMAC 224 is described below in the section entitled "COMMUNICATION DMA CONTROLLER." As used herein, the term "bus interface" is meant to encompass both a bus and a point-to-point interface (non-shared interface).

In one embodiment of the invention, the data communication system 200 may be implemented using an FPGA, such as the FPGA 100 of FIG. 1. In particular, the memory controller 204, the CPU 202, the MAC 212, the host interface logic 208, and the bus 216 may be embedded within an FPGA. The components of the data communication system 200 within the FPGA may be implemented as dedicated logic circuitry, or may be configured using programmable logic of the FPGA. The peripheral devices 220, the host device 210, the network transceiver logic 214, and the memory 206 may be located external to the FGPA and coupled thereto (e.g., on a circuit board supporting the FPGA or within an integrated circuit having the FPGA embedded therein).

In one embodiment of the invention, the data communication system 200 may be employed to terminate transmission control protocol (TCP/IP) on one or more Gigabit Ethernet ports. Notably, the MAC 212 may comprise a Gigabit Ethernet MAC (GEMAC), and the network transceiver logic 214 may comprise Gigabit Ethernet transceiver logic. The host device 210 is configured to generate or consume data that is transmitted by, or received from, the network transceiver logic 214. For example, the host device 210 may comprise a high-resolution camera.

In operation, the MAC 212 may retrieve or store Gigabit Ethernet frames in the memory 206 using the CDMAC 224. Likewise, the host interface logic 208 may retrieve or store Gigabit Ethernet frames in the memory 206 using the CDMAC 224. The Gigabit Ethernet frames are stored in the memory 206 using one DMA process and then retrieved from the memory 206 using another DMA process. The CPU 202 maintains a TCP/IP stack for the communication between the host device 210 and a network. In one embodiment, the MAC 212 includes TCP/IP checksum logic 213 for providing TCP/IP checksum offload capability. Thus, the CPU 202 is only involved in generation and decoding of TCP/IP headers. The CPU 202 does not have to process the payload data and calculate the checksum. In this manner, the effective bandwidth of the CPU 202 is increased. An exemplary embodiment of a GEMAC that may be used as the MAC 212 is described below in the section entitled "GIGABIT ETHERNET MAC."

Multi-Port Memory Controller

Figure 3:
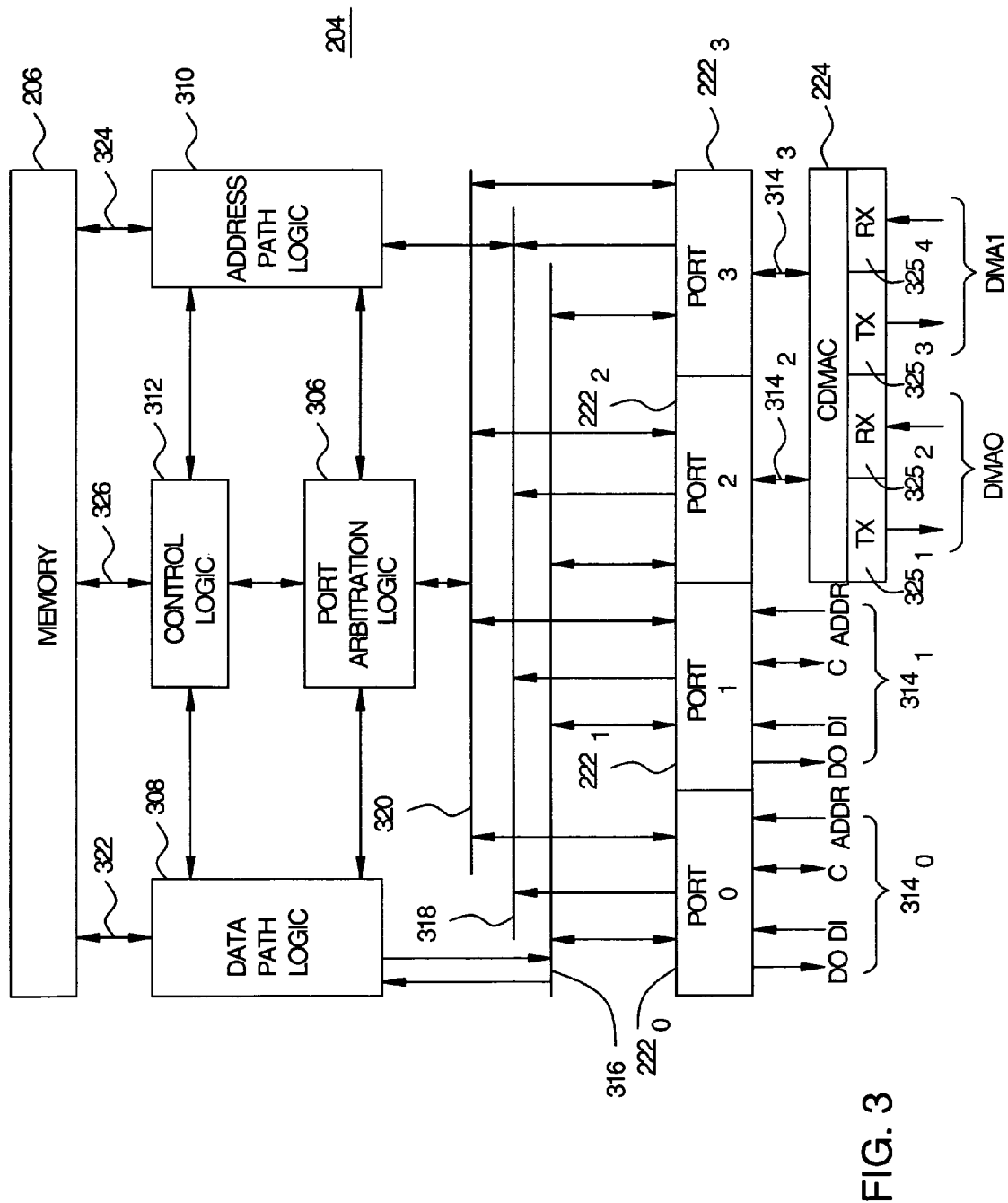
FIG. 3 is a block diagram depicting an exemplary embodiment of the multi-port memory controller (MPMC) constructed in accordance with one or more aspects of the invention.

FIG. 3 is a block diagram depicting an exemplary embodiment of the multi-port memory controller (MPMC) 204 constructed in accordance with one or more aspects of the invention. The MPMC 204 is shown coupled to the memory 206. The MPMC 204 comprises the ports $222_0$ through $222_3$ (collectively referred to as ports 222), the CDMAC 224, port arbitration logic 306, data path logic 308, address path logic 310, and control logic 312. Each of the ports $222_0$ through $222_3$ includes an input/output (I/O) path $314_0$ through $314_3$, respectively. The ports 222 may be configured with I/O paths 314 capable of communicating with various types of busses and point-to-point interfaces known in the art. In the present embodiment, the I/O paths $314_0$ and $314_1$ are capable of communicating with a bus (e.g., a PLB), and the I/O paths $314_2$ and $314_3$ are capable of communicating with the CDMAC 224. Notably, each of the I/O paths $314_0$ and $314_1$ includes a data output (DO) portion, a data input (DI) portion, a control (C) portion, and an address (ADDR) portion. Each of the I/O paths $314_2$ and $314_3$ are configured to transmit and receive data and control information to and from the CDMAC 224.

Internal data path interfaces of the ports 222 are respectively coupled to a data bus 316 within the MPMC 204. Internal address path interfaces of the ports 222 are respectively coupled to an address bus 318 within the MPMC 204. Internal control path interfaces of the ports 222 are coupled to a control bus 320 within the MPMC 204.

The data path logic 308 includes an interface coupled to the data bus 316 and a memory interface 322 coupled to the memory 206. The address path logic 310 includes an input interface coupled to the address bus 318 and a memory interface 324 coupled to the memory 206. The port arbitration logic 306 includes an interface coupled to the control bus 320, an interface coupled to the control logic 312, an interface coupled to the data path logic 308, and an interface coupled to the address path logic 310. The control logic 312 includes a memory interface 326 coupled to the memory 206, an interface coupled to the data path logic 308, and an interface coupled to the address path logic 310.

In operation, the port arbitration logic 306 executes an arbitration algorithm to select one of the ports 222 for access to the memory 206. Notably, a plurality of the ports 222 may provide memory transaction requests to the port arbitration logic 306 simultaneously. The port arbitration logic 306 analyzes all pending transaction requests and provides a request acknowledgment to one of the ports 222 in accordance with the arbitration algorithm. The one of the ports 222 that "wins" then obtains access to the memory 206 and the requested memory transaction is performed. The port arbitration logic 306 may comprise, for example, a finite state machine (FSM). An exemplary arbitration table that may be implemented using an FSM is described below with respect to FIG. 4.

The port arbitration logic 306 provides port select data to each of the address path logic 310 and the data path logic 308. The port select data includes the identity of the selected one of the ports 222. The address path logic 310 receives an address context from the selected one of the ports 222 using the port select data. Likewise, the data path logic 308 receives a data context from the selected one of the ports 222 using the port select data.

The CDMAC 224 includes DMA engines $325_1$ through $325_4$ (collectively referred to as DMA engines 325). The DMA engines $325_1$ and $325_3$ may comprise transmit (TX) DMA engines (i.e., DMA engines configured to read from the memory 206), and the DMA engines $325_2$ and $325_4$ may comprise receive (RX) DMA engines (i.e., DMA engines configured to write to the memory 206). The DMA engines $325_1$ and $325_2$ are associated with the port $222_2$ and form a first DMA interface (DMA0), and the DMA engines $325_3$ and $325_4$ are associated with the port $222_3$ and form a second DMA interface (DMA1). The data and address context information for the ports $222_2$ and $222_3$ is generated by the CDMAC 224. The DMA interfaces (DMA0 and DMA1) are point-to-point interfaces, such as LocalLink interfaces. An exemplary embodiment of the CDMAC 224 is described below in the section entitled "Communication DMA controller."

After granting a transaction request from one of the ports 222, the port arbitration logic 306 provides a memory transaction request to the control logic 312. The control logic 312 processes the memory transaction request and determines a sequence of sub-transactions required to perform the desired memory transaction. Each of the sub-transactions comprises a sequence of memory operations for causing the memory 206 to perform a particular action. Thus, each memory transaction comprises a sequence of sequences of memory operations.

The control logic 312 drives the data path logic 308, the address path logic 310, and the memory interface 326 with control signals that execute memory operations on the memory 206. The data path logic 308 drives the memory interface 322 with data signals to perform the memory operations indicated by the control signals from the control logic 312. Likewise, the address path logic 310 drives the memory interface 324 with address signals to perform the memory operations indicated by the control signals from the control logic 312. The end result is that the requested memory transaction provided by the arbitration logic 306 is performed. The control logic 312 provides a complete signal to the port arbitration logic 306 to indicate that another memory transaction may be issued.

For purposes of clarity by example, the MPMC 204 has been described as having four ports 222. It is to be understood, however, that the MPMC 204 may generally include a plurality of ports. Notably, while the number of ports affects the complexity of the circuitry defining the MPMC 204, the number of ports does not change the principle of operation described above. In addition, while the MPMC 204 has been described as having a CDMAC in communication with two of the ports, those skilled in the art will appreciate that the MPMC 204 may be constructed without a CDMAC, without multiple CDMACS, or with a CDMAC in communication with more than two of the ports.

FIG. 4 depicts an exemplary embodiment of an arbitration table 400 in accordance with one or more aspects of the invention. The arbitration table 400 may be understood with simultaneous reference to FIG. 3. The arbitration table 400 may be used by the arbitration logic 306 to arbitrate memory access among the ports 222. In the table 400, the ports $222_0$ through $222_3$ are identified as ports P0 through P3, respectively. The table 400 includes four time-slots in which the ports may obtain access the memory 206, designated TS1 through TS4, where the time slots TS3A and TS3B collectively form the time slot TS3, and the time slots TS4A and TS4B collectively form the time slot TS4. The time slots TS1 through TS4 need not be of equal durations, and need not have fixed durations. Rather, the duration of a time slot depends on the particular requested transaction (e.g., the amount of clock cycles required to perform the requested transaction).

For each of the time slots TS1 through TS4, the arbitration table 400 includes three priority levels, PR1 through PR3, where PR1 indicates the highest priority and PR3 indicates the lowest priority. In operation, one or more of the ports P0 through P3 provide transaction requests to the port arbitration logic 306, where some of the requests may be provided simultaneously. To determine which of the ports P0 through P3 can obtain access to the memory 206, the port arbitration logic 306 repeatedly sequences through the time slots TS1 through TS4. Whether the port arbitration logic 306 acknowledges a transaction request from a particular port depends on the current time slot and the priority levels assigned to the ports in the current time slot. In other words, if a given port desires access to the memory 206, the port must have the highest priority in the current time slot. Otherwise, the port must wait until such conditions are satisfied.

In particular, for the time slots TS1 and TS2, the port arbitration logic 306 selects the port desiring access to the memory 206 having the highest priority. The port arbitration logic 306 sends a request acknowledgement to the selected port and the transaction is performed. For example, in time slot TS1, if the port P0 desires access to the memory 206, the port arbitration logic 306 selects the port P0. If the port P0 does not desire access to the memory 206, but the port P1 does, the port arbitration logic 306 selects the port P1. If both ports P0 and P1 desire access to the memory 206, the port arbitration logic 206 selects port P0, since port P0 has the highest priority. The port arbitration logic 306 operates similarly in the time slot TS2, but the priorities between port P0 and port P1 are reversed. In either of the time slots TS1 and TS2, if no port desires access to the memory 206 for any priority level, then the port arbitration logic 306 proceeds to the next time slot. The port arbitration logic 306 may stall one clock cycle before proceeding to the next time slot.

In the time slot TS3, the port arbitration logic 306 selects the port P2 if the port P2 desires access to the memory 206. If the port P2 does not desire access to the memory 206, the time slot TS3 is divided into time slots TS3A and TS3B and the ports P0 and P1 can obtain memory access in accordance with the priority levels of the table 400. In this manner, the ports P0 and P1 do not have to wait until the time slots TS1 and TS2 to obtain memory access if the port P2 does not require memory access. If no port desires memory access, the port arbitration logic 306 proceeds to the next time slot (TS4 in this case). In the time slot TS4, the port arbitration logic 306 operates in a manner similar to the time slot TS3, but with the port P3 having the highest priority.

For example, the time slots TS1 and TS2 may support a single four- or eight-word cache-line operation (i.e., system bus operations). The time slots TS3 and TS4 may support 16-word burst memory transactions (i.e., DMA operations), which require more clock cycles than cache-line operations. If such 16-word burst memory transactions are not requested, each of the time slots TS3 and TS4 may support two cache-line operations.

In this manner, the port arbitration logic 306 grants access to the memory 206 on a time-shared basis to the ports 222. In addition, the port arbitration logic 306 is opportunistic in that more active ports (e.g., ports P0 and P1) may obtain memory access outside of their assigned time slots if other ports are less active (e.g., ports P2 and P3). For purposes of clarity by example, the port arbitration logic 306 is described with respect to an MPMC having four ports (the MPMC 204 of FIG. 3). It is to be understood, however, that the port arbitration logic 306 may be generally configured for a plurality of ports. In addition, while the port arbitration logic 306 as been described with respect to time slots TS3 and TS4 having two sub-slots, those skilled in the art will appreciate that other time-slot configurations may be used. In general, one or more of the implemented time-slots may have multiple sub-slots, or each of the time-slots may be identical.

Figure 5:
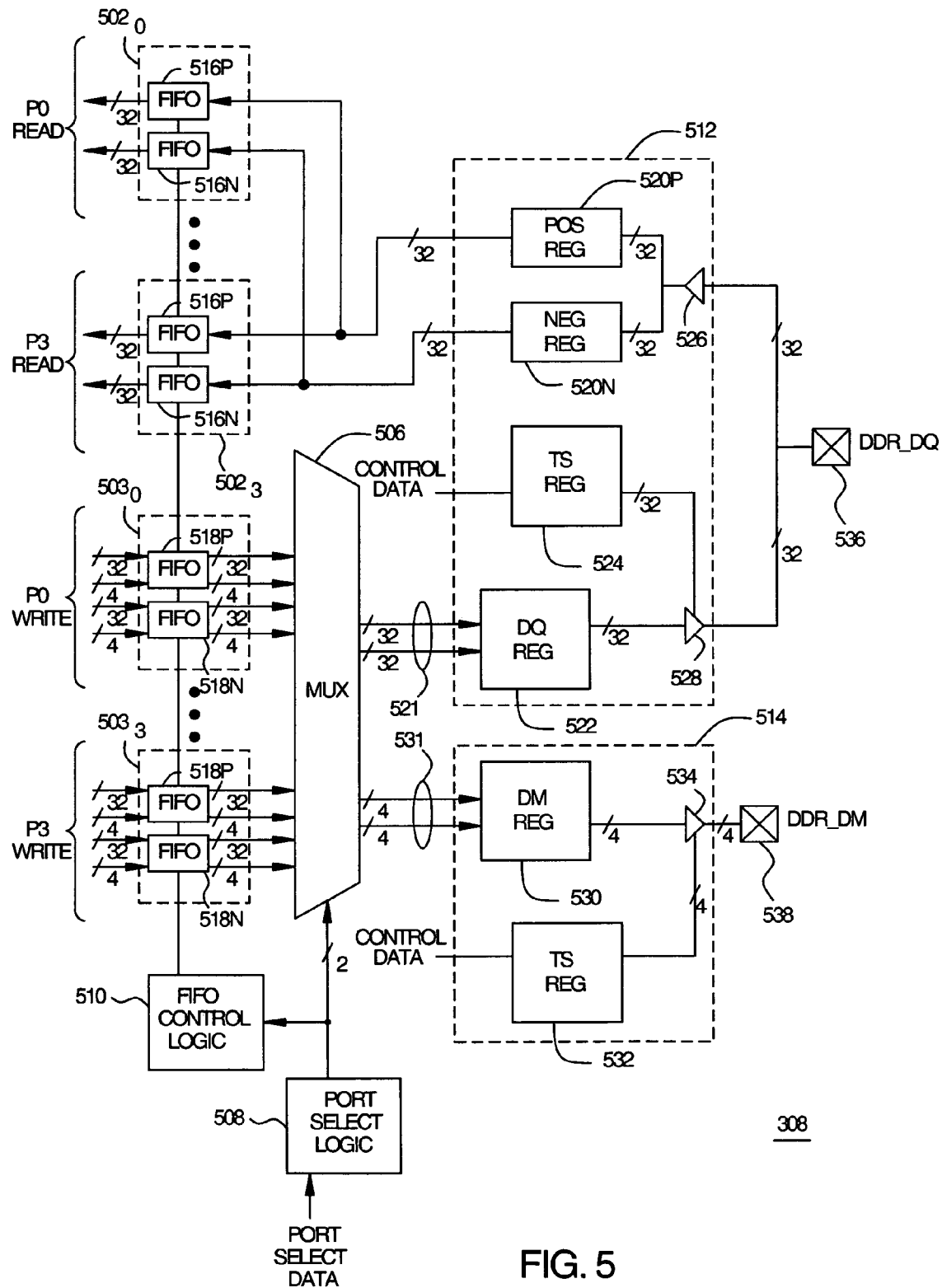
FIG. 5 is a block diagram depicting an exemplary embodiment of data path logic within the MPMC of FIG. 3.

FIG. 5 is a block diagram depicting an exemplary embodiment of the data path logic 308 of FIG. 3. Notably, the data path logic 308 drives a data interface ("DDR_DQ interface 536") and a data mask interface ("DDR_DM interface 538") of the memory 206. The DDR_DQ interface 536 and the DDR_DM interface 538 of DDR SDRAM are well-known in the art.

The data path logic 308 comprises port read logic $502_0$ through $502_3$, port write logic $503_0$ through $503_3$, a multiplexer 506, port select logic 508, FIFO control logic 510, data interface logic 512, and data-mask interface logic 514. Each read port logic $502_0$ through $502_3$ includes a FIFO 516P and a FIFO 516N. Each write port logic $503_0$ through $503_3$ includes a FIFO 518P and a FIFO 518N. The data interface logic 512 and the data-mask interface logic 514 are double data rate circuits to match the interface of the memory 206 (i.e., there is data for every edge of the clock). Each port read logic $502_0$ through $502_3$, and each port write logic $503_0$ through $503_3$, includes single date rate circuits to match the bus with which the ports 222 communicate (i.e., there is data for only the leading edge of the clock). For simplicity, clock signal inputs of the components of the data path logic 308 are not shown.

An input interface of the port select logic 508 is configured to receive port select data from the port arbitration logic 306. An output interface of the port select logic 508 is coupled to a selection port of the multiplexer 506 and an input interface of the FIFO control logic 510. An output interface of the FIFO control logic 510 is coupled to the FIFOs 516P and 516N in each port read logic $502_0$ through $502_3$, as well as the FIFOs 518P and 518N in each port write logic $503_0$ through $503_3$.

The data interface logic 512 includes a positive edge register 520P, a negative edge register 520N, a DQ register 522, a three-state (TS) control register 524, a buffer 526, and a three-state buffer 528. The data interface logic 514 includes a DM register 530, a TS control register 532, and a three-state buffer 534.

An input port of the buffer 526 is coupled to the DQ interface 536. An output port of the buffer 526 is coupled to an input port of the positive edge register 520P and an input port of the negative edge register 520N. The positive edge register 520P operates on the positive edge of the DDR clock, and the negative edge register 520N operates on the negative edge of the DDR clock. The registers 520P and 520N may comprise D flip-flops, for example. Illustratively, the registers 520P and 520N are 32-bit registers for receiving 32-bit words from the DQ interface 536.

An output port of the positive edge register 520P is coupled to the FIFO 516P in each of the port read logic $502_0$ through $502_3$. An output port of the negative edge register 520N is coupled to the FIFO 516N in each of the port read logic $502_0$ through $502_3$. Illustratively, for each port read logic $502_0$ through $502_3$, the FIFOs 516P and 516N are 32-bit FIFOs for buffering N 32-bit words from the DQ-interface 536, where N is an integer greater than zero. For example, the FIFOs 516P and 516N may be 16 entries deep (i.e., the FIFOs 516P and 516N may store sixteen 32-bit words. The FIFOs 516P and 516N may comprise shift registers, for example. Alternatively, the FIFOs 516P and 516N may be logical FIFOs implemented within a memory circuit, such as BRAM within an FPGA. An output of the FIFO 516P provides data retrieved from the DDR-DQ interface 536 on the positive edge of the DDR clock. An output of the FIFO 516N provides data retrieved from the DDR_DQ interface 536 on the negative edge of the DDR clock.

Notably, data is pushed into, and popped off, the FIFOs 516P and 516N in accordance with control signals generated by the FIFO control logic 510. The FIFO control logic 510 provides push and pop signals to the FIFOs 516P and 516N in the specific one of the port read logic $502_0$ through $502_3$ corresponding to the port select data. In one embodiment, the FIFOs 516P and 516N are "fall through" FIFOs, which saves an entire clock cycle of latency. In this manner, data may be read from the memory 206 through a selected one the ports 222.

For each of the port write logic $503_0$ through $503_3$, each of the FIFOs 518P and 518N includes two input ports, one for receiving data to be coupled to the DDR_DQ interface 536 and one for receiving mask data (e.g., byte enable data) to be coupled to the DDR_DM interface 538. Illustratively, the FIFOs 518P and 518N are 36-bit FIFOs for buffering N 36-bit words, where N is an integer greater than zero. Each 36-bit word comprises 32 bits of data to be coupled to the DDR_DQ interface 536, and 4 bits of mask data to be coupled to the DDR_DM interface 538. For example, the FIFOs 518P and 518N may be 16 entries deep (i.e., the FIFOs 518P and 518N may store sixteen 36-bit words. The FIFOs 518P and 518N may comprise shift registers, for example. Alternatively, the FIFOs 518P and 518N may be logical FIFOs implemented within a memory circuit (which may be the same memory circuit used for the FIFOs 516P and 516N), such as BRAM within an FPGA.

Notably, data is pushed into, and popped off, the FIFOs 518P and 518N in accordance with control signals generated by the FIFO control logic 510. The FIFO control logic 510 provides push and pop signals to the FIFOs 518P and 518N in the specific one of the port write logic $503_0$ through $503_3$ corresponding to the port select data. In this manner, data may be written to the memory 206 through a selected one the ports 222.

For each of the port write logic $503_0$ through $503_3$, each of the FIFOs 518P and 518N includes two output ports coupled to the multiplexer 506, one for providing data, and one for providing mask data. The multiplexer 506 includes two output ports 521 coupled to respective input ports of the DQ register 522. The multiplexer 506 also includes two output ports 531 coupled to respective input ports of the DM register 530. The output ports 521 are configured to provide data from the FIFOs 518P and 518N for a selected one of the port write logic $503_0$ through $503_3$. The output ports 531 are configured to provide mask data from the FIFOs 518P and 518N for the selected one of the port write logic $503_0$ through $503_3$. The multiplexer 506 selects output from one of the port write logic $503_0$ through $503_3$ in accordance with the port select data from the port select logic 508.

An output port of the DQ register 522 is coupled to an input port of the three-state buffer 528. An input port of the TS control register 524 is configured to receive control data from the control logic 312. An output port of the TS control register 524 is coupled to another input port of the three-state buffer 528. An output port of the three-state buffer 528 is coupled to the DDR_DQ interface 536.

An output port of the DM register 530 is coupled to an input port of the three-state buffer 534. An input port of the TS control register 532 is configured to receive control data from the control logic 312. An output port of the TS control register 532 is coupled to another input port of the three-state buffer 534. An output port of the three-state buffer 534 is coupled to the DDR_DM interface 538.

The generation of the control data coupled to the TS control registers 524 and 532 is described below with respect to the control logic 312. As the control logic 312 determines which action is to be performed by the memory, the control logic 312 is configured to provide control data to the TS control registers 524 and 532 to implement the required functions. The TS control registers 524 and 532 are configured to activate and deactivate output drivers in the buffers 528 and 534, respectively, since the interfaces 536 and 538 are bi-directional.

Figure 6:
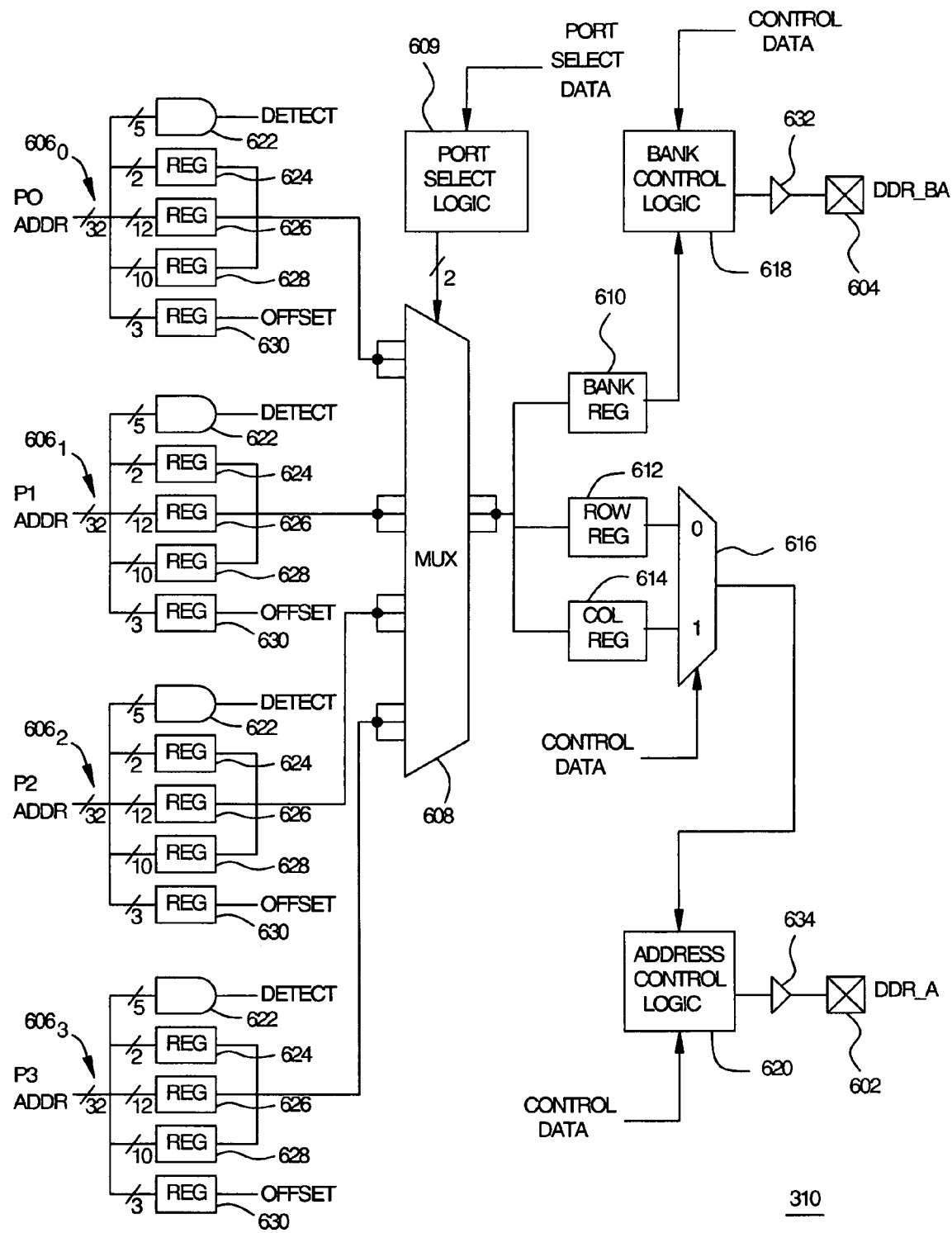
FIG. 6 is a block diagram depicting an exemplary embodiment of address path logic within the MPMC of FIG. 3.

FIG. 6 is a block diagram depicting an exemplary embodiment of the address path logic 310 of FIG. 3. Notably, the address path logic 310 drives an address interface ("DDR_A interface 602") and a bank address interface ("DDR_BA interface 604") of the memory 206. The DDR_A interface 602 and the DDR_BA interface 604 of DDR SDRAM are well-known in the art. The address path logic 310 comprises port logic $606_0$ through $606_3$, a multiplexer 608, port select logic 609, a bank register 610, a row register 612, a column register 614, a multiplexer 616, bank control logic 618, and address control logic 620. Each port logic $606_0$ through $606_3$ includes a logic gate 622 (e.g., an AND gate) and registers 624, 626, 628, and 630.

Each port logic $606_0$ through $606_3$ receives an address context from ports $222_0$ through $303_3$, respectively. In the present embodiment, the address context is 32 bits, although the invention is not limited to such, and address contexts may have other widths. Illustratively, the address context includes five bits static bits, two bank address bits, 12 row address bits, 10 column address bits, and three offset address bits, although the address context may be divided in other ways. An input port of the logic gate 622 receives the static bits, an input port of the register 624 receives the bank address, an input port of the register 626 receives the row address, an input port of the register 628 receives the column address, and an input port of the register 630 receives the offset address. The registers 624 through 630 may comprise, for example, D flip-flops.

For each port logic $606_0$ through $606_3$, output ports of the registers 624, 626, and 628 are coupled to the multiplexer 608. An output port of the logic gate 622 provides an address detect signal, which may be coupled to the port arbitration logic 306, described above. The port arbitration logic 306 uses the address detect signal to determine that a port is requesting access to a valid address in the memory 206. An output port of the register 630 provides an address offset signal. The address offset signal is used to process transactions that are not 32-byte or 128-byte aligned, in which case the MPMC 204 must perform two memory accesses to get all of the desired data.

An input interface of the port select logic 609 receives port select data from the port arbitration logic 306. An output interface of the port select logic 609 is coupled to a selection port of the multiplexer 608. In response to the port select data, the multiplexer 608 selects a bank address, a row address, and a column address from one of the ports 222. One output port of the multiplexer 608 provides the bank address to an input port of the bank register 610. Another output port of the multiplexer 608 provides the row address to an input port of the row register 612. Another output port of the multiplexer 608 provides the column address to an input port of the column register 614. The registers 610 through 614 may comprise, for example, D flip-flops.

An output port of the bank register 610 is coupled to an input interface of the bank control logic 618. Another input interface of the bank control logic 618 is configured to receive control data from the control logic 312. An output interface of the bank control logic 618 is coupled to a buffer 632, which is coupled to the DDR_BA interface 604. Output ports of the row register 612 and the column register 614 are respectively coupled to input ports of the multiplexer 616. A selection port of the multiplexer 616 is configured to receive control data from the control logic 312. An output port of the multiplexer 616 is coupled to an input interface of the address control logic 620. Another input interface of the address control logic 620 is configured to receiver control data from the control logic 312. An output interface of the address control logic 620 is coupled to a buffer 634, which drives the DDR_A interface 602.

The generation of the control data coupled to each of the bank control logic 312, the multiplexer 616, and the address control logic 620 is described below with respect to the control logic 312. As is well-known in the art, the DDR_BA interface 604 and the DDR_A interface have different functions depending on the particular action being performed by the memory 206. For example, the DDR_BA interface 604 may be used to pre-charge a particular bank in the memory 206, as well as to select a particular address location with the memory. In addition, the memory 206 is addressed first by a row, then by a column. As the control logic 312 determines which action is to be performed by the memory, the control logic 312 is configured to provide control data to the bank control logic 618, the multiplexer 616, and the address control logic 620 to implement the required functions.

Figure 7:
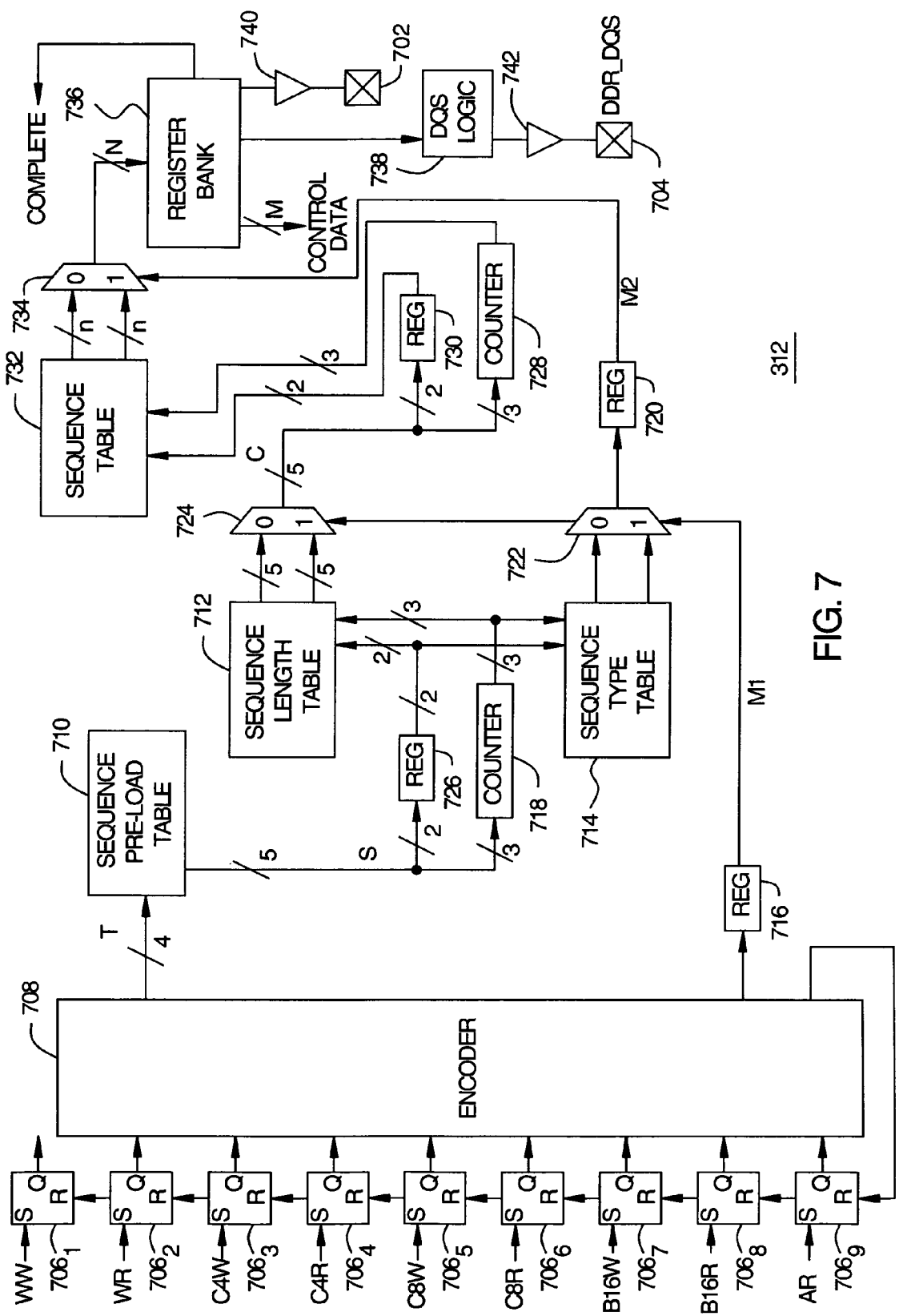
FIG. 7 is a block diagram depicting an exemplary embodiment of control logic within the MPMC of FIG. 3.

FIG. 7 is a block diagram depicting an exemplary embodiment of the control logic 312 of FIG. 3. Notably, the control logic 312 drives a control interface 702 and data strobe interface ("DDR_DQS interface 704") of the memory 206. The control interface 702 comprises DDR_RAS, DDR_CAS, and DDR_WE interfaces. The DDR_RAS, DDR_CAS, DDR_WE, and DDR_DQS interfaces of DDR SDRAM are well-known in the art.

The control logic 312 comprises flip-flops $706_1$ through $706_9$ (collectively referred to as flip-flops 706), an encoder 708, a sequence pre-load table 710, a sequence length table 712, a sequence type table 714, registers 716, 720, 726, 730, counters 718 and 728, multiplexers 722, 724, and 734, a sequence table 732, a register bank 736, and DQS logic 738. The flip-flops 706 are set-reset flip-flops. The registers 716, 720, 726, and 730 may be D flip-flops. The sequence pre-load table 710, the sequence length table 712, the sequence type table 714, and the sequence table 732 may be read-only memories (ROMs). For example, the tables 710, 712, 714, and 732 may each comprise a plurality of LUTs configured to store data, as described below.

A set port of each of the flip-flops 706 is configured to receive a memory transaction request from the port arbitration logic 306. In the present embodiment, the possible memory transactions include word-write (WW), word-read (WR), four-byte cache-line read (CL4R), four-byte cache-line write (CL4W), eight-byte cache-line read (CL8R), eight-byte cache-line write (CL8W), 16-word burst read (B16R), 16-word burst write (B16W), and auto-refresh (AR) transactions. Only one memory transaction request is coupled to the flip-flops 706 at a time, until the control logic 312 asserts a transaction complete signal, as discussed below.

Figure 8:
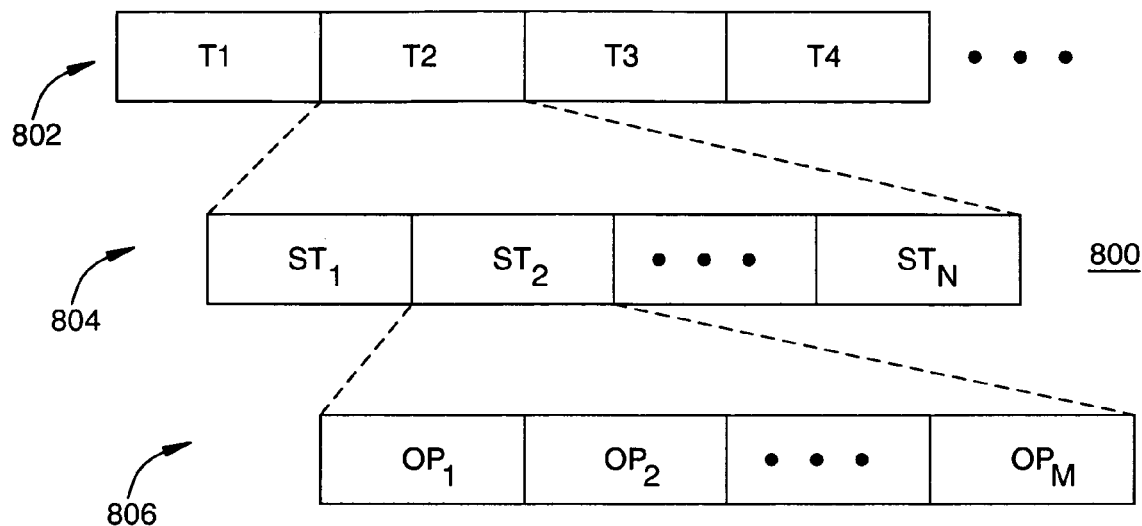
FIG. 8 is a block diagram depicting a hierarchy associated with a memory transaction.

As discussed above, a memory transaction requires execution of several memory operations in a specific sequence. FIG. 8 is a block diagram depicting a hierarchy 800 associated with a memory transaction. In particular, a first level 802 of the hierarchy 800 includes a series of memory transactions T1 through T4. Each of the memory transactions T1 through T4 includes a sequence of sub-transactions $ST_1$ through $ST_N$, where N is an integer greater than zero. The sub-transactions $ST_1$ through $ST_N$ comprise a second level 804 of the hierarchy 800. Sub-transactions include, for example, pre-charge, activate, two-byte read, two-byte write, four-byte read, four-byte write, no-operation (NOP), and auto-refresh operations. For example, a CL4W transaction may require pre-charge, activate, and a four-byte write sub-transaction. Each of the sub-transactions includes a sequence of memory operations $OP_1$ through $OP_M$, where M is an integer greater than zero. The memory operations $OP_1$ through $OP_M$ comprise a third level 806 of the hierarchy 800. For example, a pre-charge sub-transaction may require a pre-charge memory operation followed two NOPs.

Returning to FIG. 7, an output port of each of the flip-flops 706 is coupled to the encoder 708. An output port of the encoder 708 is coupled to an address interface of the sequence pre-load table 710 (signal T). In the present embodiment, the encoder 708 drives the address interface of the sequence pre-load table 710 with a four-bit value (i.e., the number of bits required to represent the nine different memory transactions). The encoder 708 generates a unique four-bit value for each of the nine possible memory transactions.

Figure 9:
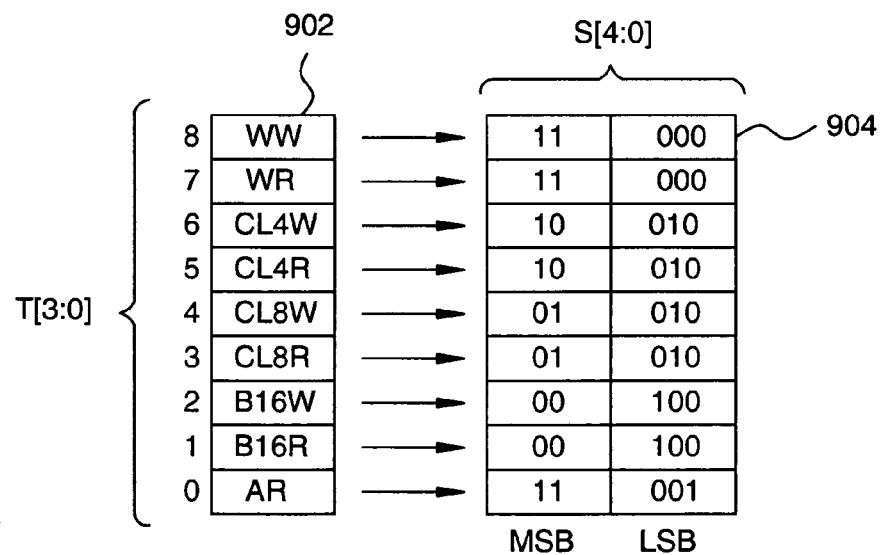
FIG. 9 is a diagram depicting an exemplary embodiment of a sequence pre-load table within the control logic of FIG. 7.

FIG. 9 is a diagram depicting an exemplary embodiment of the sequence pre-load table 710. The sequence pre-load table 710 includes nine entries 902 corresponding to the possible transactions input to the control logic 312. The entries 902 are addressable using the signal T output by the encoder 708. Each of the entries includes a five-bit word 904. For each of the entries 902, the five-bit word 904 is configured to address the sequence length table 712 and the sequence type table 714. If a particular one of the entries 902 is addressed using the signal T, the corresponding word 904 is output as a signal S. The sequence pre-load table 710 may comprise five 9×1 ROMs.

Returning to FIG. 7, an output port of the sequence pre-load table 710 is coupled to a data port of the register 726 and an input port of the counter 718 (the signal S). The output of the sequence pre-load table 710 is a five-bit value, where two bits are coupled to the register 716 and three bits are coupled to the counter 718. An output port of the register 726 (two-bit output) is coupled to an address interface of the sequence length table 712 and an address interface of the sequence type table 714. An output port of the counter 718 (three-bit output) is coupled to the address interface of the sequence length table 712 and the address interface of the sequence type table 714.

Figure 10:
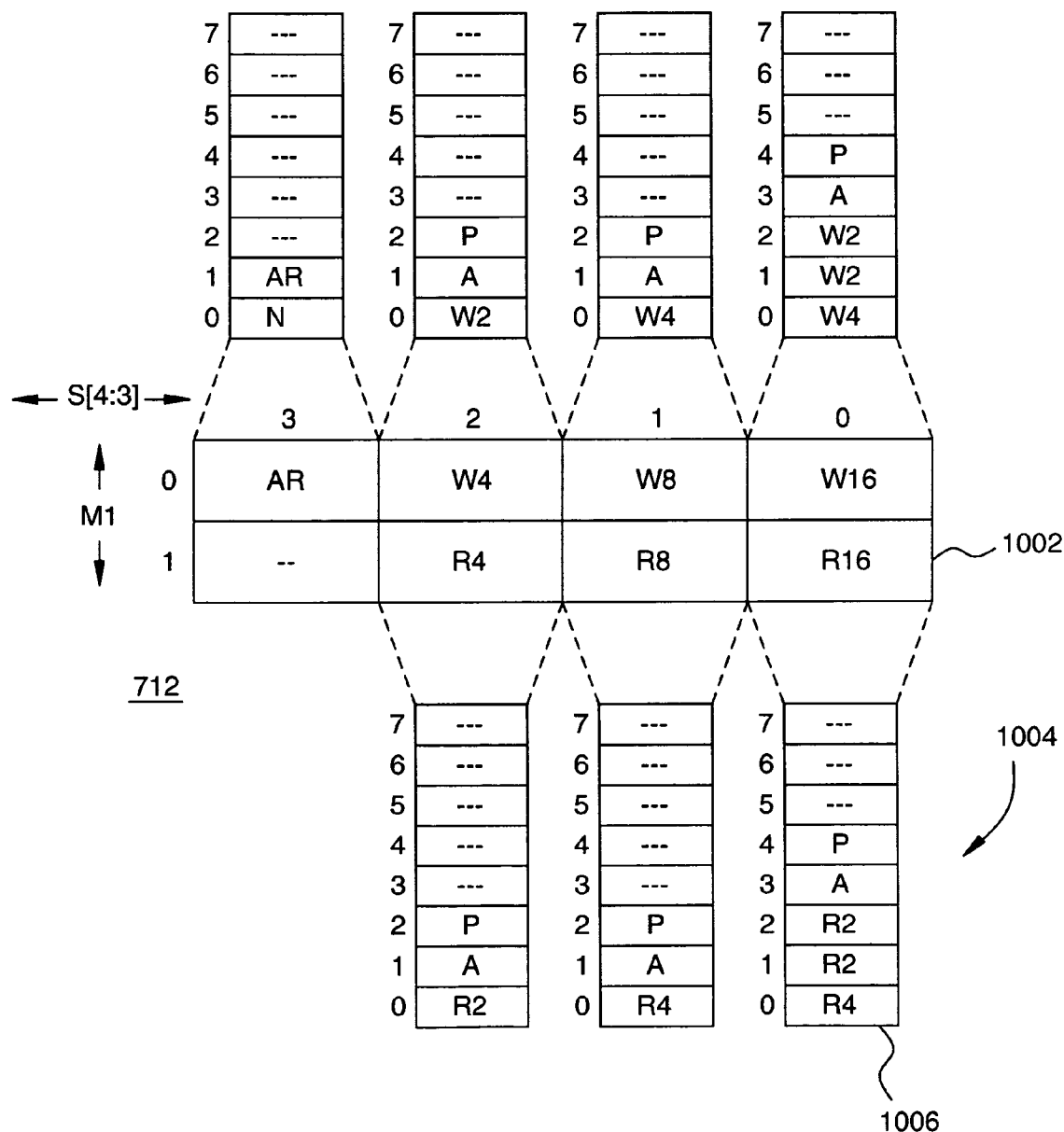
FIG. 10 is a diagram depicting an exemplary embodiment of a sequence length table within the control logic of FIG. 7.

FIG. 10 is a diagram depicting an exemplary embodiment of the sequence length table 712. The sequence length table 712 includes eight entries 1002 corresponding to the transactions input to the control logic 312. The entries 1002 are addressable by the two most significant bits of the signal S (denoted S[4:3]). Each of the entries 1002 includes sub-entries 1004 for up to eight sub-transactions. The sub-entries 1004 are addressable by the three least significant bits of the signal S (denoted S[2:0]).

In the present embodiment, possible sub-transactions include pre-charge (P), auto-refresh (AR), no-operation (NOP), activate (A), 2× (W2), 2× read (R2), 4× write (W4), and 4× read (R4) sub-transactions, where 2× and 4× relate to the number of clock cycles per sub-transaction (2 or 4 clock cycles). Note that, in the present embodiment, there are two operations per clock cycle (DDR) and thus a W2 sub-transaction, for example, writes four words. Each of the sub-entries 1004 includes a five-bit word 1006 configured to address the sequence table 732 (i.e., a five-bit word is associated with each sub-transaction). For clarity, the words 1006 are designated by their corresponding sub-transactions, rather than the actual bit values. The actual bit values will be readily apparent from the description of the sequence table 732 of FIG. 11. The sequence length table 712 may comprise ten 32×1 ROMs.

In operation, a particular one of the entries 1002 is addressed by the output of the register 726. For the addressed entry, an initial one of the sub-entries 1004 is addressed by the output of the counter 718, which is initialized by the three least significant bits of the signal S provided by the sequence pre-load table 710. For example, for a R4 type-transaction (e.g., a CL4R), the counter 718 is initialized with a value of two, which is the first word 1006 in the sub-entry in the entry associated with the R4 transaction. The counter 718 then counts down to zero while the output of the register 726 is held. As the output value of the counter 718 is decremented, the next sub-entry is addressed. In response to the address signal S, the sequence length table 712 outputs two five-bit values, one for each row. One of the five-bit values is selected using the multiplexer signal M1 discussed below.

Returning to FIG. 7, a pair of output ports of the sequence length table 712 is coupled to the multiplexer 724. A one-bit select signal generated by the encoder 708 is coupled to a data port of the register 716. An output port of the register 716 (signal M1) is coupled to a selection port of the multiplexer 722 and a selection port of the multiplexer 724.

An output port of the multiplexer 724 (a signal C) is coupled to a data port of the register 730 and the counter 728. The multiplexer 724 provides a five-bit value, where two bits (C[4:3]) are provided to the register 730 and three bits (C[2:0]) are coupled to the counter 728. An output port of the register 730 (two-bit output) is coupled to an address interface of the sequence table 732. An output port of the counter 728 (three-bit output) is coupled to the address interface of the sequence table 732.

Figure 11:
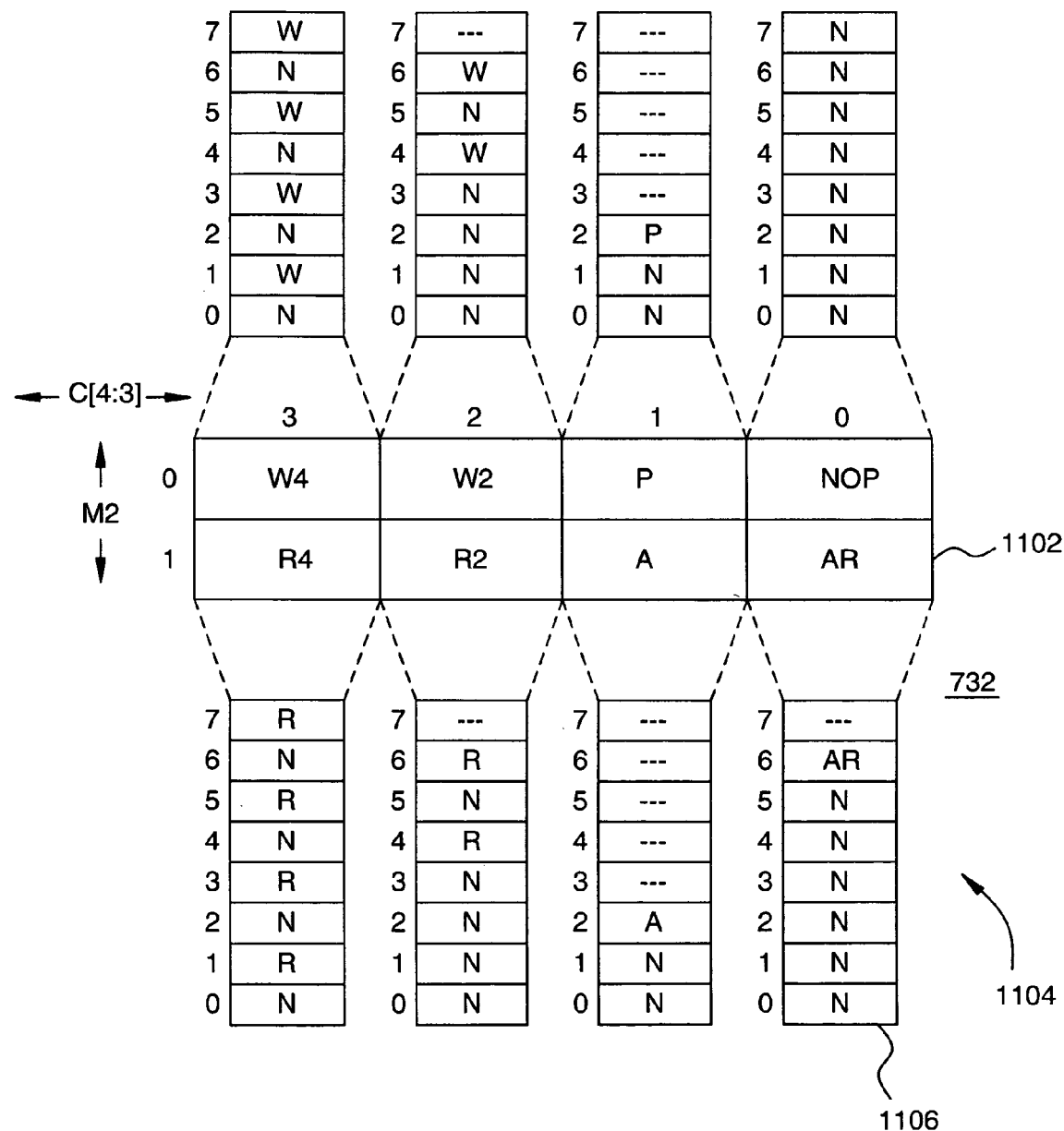
FIG. 11 is a diagram depicting an exemplary embodiment of a sequence table within the control logic of FIG. 7.

FIG. 11 is a diagram depicting an exemplary embodiment of the sequence table 732. The sequence table 732 includes eight entries 1102 corresponding to the sub-transactions of the sequence length table 712. The entries 1102 are addressable by the two most significant bits of the signal C (denoted C[4:3]). Each of the entries 1102 includes sub-entries 1104 for up to eight memory operations. The sub-entries 1104 are addressable by the three least significant bits of the signal C (denoted C[2:0]).

In the present embodiment, possible memory operations include pre-charge (P), auto-refresh (AR), no-operation (NOP), activate (A), write (W), and read (R) operations. Each of the sub-entries 1104 includes an n-bit word 1106 configured to drive the register bank 736 (i.e., an n-bit word is associated with each memory operation). For clarity, the words 1106 are designated by their corresponding memory operations, rather than the actual bit values. The sequence table 732 may comprise n 32×1 ROMs.

In operation, a particular one of the entries 1102 is addressed by the output of the register 730. For the addressed entry, an initial one of the sub-entries 1104 is addressed by the output of the counter 728, which is initialized by the three least significant bits of the signal C provided by the multiplexer 724. For example, for an activate sub-transaction, the counter 728 is initialized with a value of two, which is the first word 1106 in the sub-entry in the entry associated with the activate sub-transaction. The counter 728 then counts down to zero while the output of the register 730 is held. As the output value of the counter 728 is decremented, the next sub-entry is addressed. In response to the address signal C, the sequence table 732 outputs two n-bit values, one for each row. One of the n-bit values is selected using the multiplexer signal M2 discussed below.

Returning to FIG. 7, a pair of output ports of the sequence type table 714 is coupled to the multiplexer 722. An output port of the multiplexer 722 is coupled to a data port of the register 720. An output port of the register 720 is coupled to a selection port of the multiplexer 734.

The sequence type table 714 is configured identically to the sequence length table 712 shown in FIG. 10. That is, the entries in the sequence type table 714 are identical to the entries 1002 in the sequence length table 712 (the rows and columns are the same). In addition, the sequence type table 714 is addressed in the same manner as the sequence length table 712. However, each of the sub-entries for a given entry in the sequence type table 714 includes a single bit (as opposed to a five-bit word). The one-bit values of the sequence type table 714 correspond to respective five-bit words in the sequence length table 712. In other words, for each sub-transaction selected by the address signal S, two five-bit words are output by the sequence length table 712, and two one bit values are output by the sequence type table 714. One of the two five-bit words, and a corresponding one of the two one-bit values is selected by the signal M1.

The signal M1 is generated by the encoder 708. The encoder 708 has knowledge of which of the rows in the sequence length table 712 and the sequence type table 714 contains the transaction-type for the input transaction. That is, row 0 includes AR, W4, W8, and W16 transaction-types, and row 1 includes R4, R8, and R16 transaction types. This knowledge is supplied to the multiplexers 724 and 722 to select the correct row in the sequence length table 712 and the sequence type table 714.

A similar mechanism is employed using the one-bit value output by the sequence type table 714 for the multiplexer 734. That is, the sequence type table 712 includes knowledge of which of the rows in the sequence table 732 contains the current sub-transaction. That is, row 0 includes W4, W2, P, and NOP sub-transactions, and row 1 includes R4, R2, A, and AR sub-transactions. This knowledge is supplied to the multiplexer 734 to select the correct row in the sequence table 732.

A pair of output ports of the sequence table 732 is coupled to the multiplexer 724. The sequence table 732 provides n-bit values selected in accordance with a two-bit value from the register 730 and a three-bit value from the counter 728. An output port of the multiplexer 734 is coupled to the register bank 736. The multiplexer 734 provides an n-bit value to the register bank 736. One output port of the register bank 736 is coupled to a buffer 740. The buffer 740 is coupled to the control interface 702. Another output port of the register bank 736 is coupled to the DQS logic 738. The DQS logic 738 is coupled to a buffer 742, which is coupled to the DDR_DQS interface 704. Another output port of the register bank 736 provides m-bits of control data. The control data is coupled to the data path logic 308 and the address path logic 310 to drive the memory to perform the required memory operation as dictated by the n-bit output of the multiplexer 734. Yet another output port of the register bank 736 provides a complete signal to the port arbitration logic 306.

Figure 12:
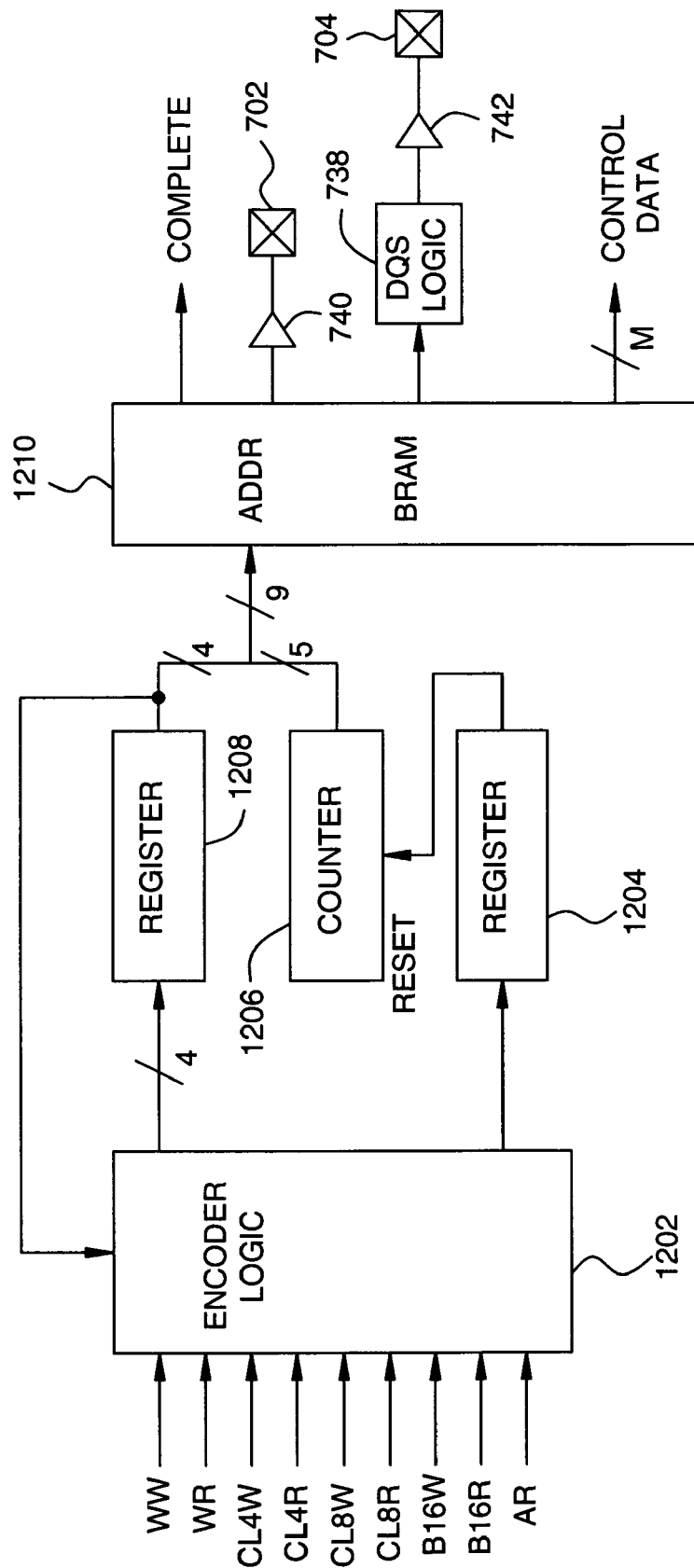
FIG. 12 is a block diagram depicting another exemplary embodiment of the control logic within the MPMC of FIG. 3.

FIG. 12 is a block diagram depicting another exemplary embodiment of the control logic 312 of FIG. 3. Elements in FIG. 12 that are the same or similar to elements in FIG. 7 are designated with identical reference numerals and described in detail above. In the present embodiment, the control logic 312 comprises encoder logic 1202, a register 1208, a counter 1206, a register 1204, and a RAM 1210. The RAM 1210 is illustratively shown as a BRAM of an FPGA (discussed above in FIG. 1). The encoder logic 1202 implements the flip-flops 706 and the encoder 708 shown in FIG. 7 and described above.

Input ports of the encoder logic 1202 receive transactions from the port arbitration logic 306. The types of transactions and the hierarchy associated therewith is discussed above. An output port of the encoder logic 1202 is coupled to an input port of the register 1208. The encoder logic 1202 provides the register 1208 with a four-bit signal (i.e., the number of bits required to represent the nine transaction-types). Another output of the encoder logic 1202 is coupled to the register 1204. An output port of the register 1204 is coupled to a reset port of the counter 1206. The counter 1206 provides a five bit output.

An address port of the BRAM 1210 is coupled to the output port of the register 1208 and the output port of the counter 1206. Thus, the address port of the BRAM 1210 receives a 9-bit address. An output interface of the BRAM 1210 provides the complete signal, DDR control signals from the buffer 740, a data strobe signal for the DQS logic 738, and the control data.

In the present embodiment, the BRAM 1210 performs the functionality of the sequence pre-load table 710, the sequence table 732, the sequence length table 712, and the sequence type table 714 described above. Notably, the BRAM 1220 stores all the data present in the tables 712, 714, and 732. A transaction-type is encoded by the encoder logic 1202 in response to a given transaction and provided to the BRAM through the output of the register 1208. In particular, the transaction-type is selected using the four most significant bits of the address signal coupled to the BRAM 1210. Output from the counter 1206 comprises the five least significant bits of the address signal coupled to the BRAM 1210. As the output of the counter 1206 decrements, the output of the BRAM 1210 cycles through sequences of sequences of memory operations, as discussed in detail above.

Communication DMA Controller

Figure 13:
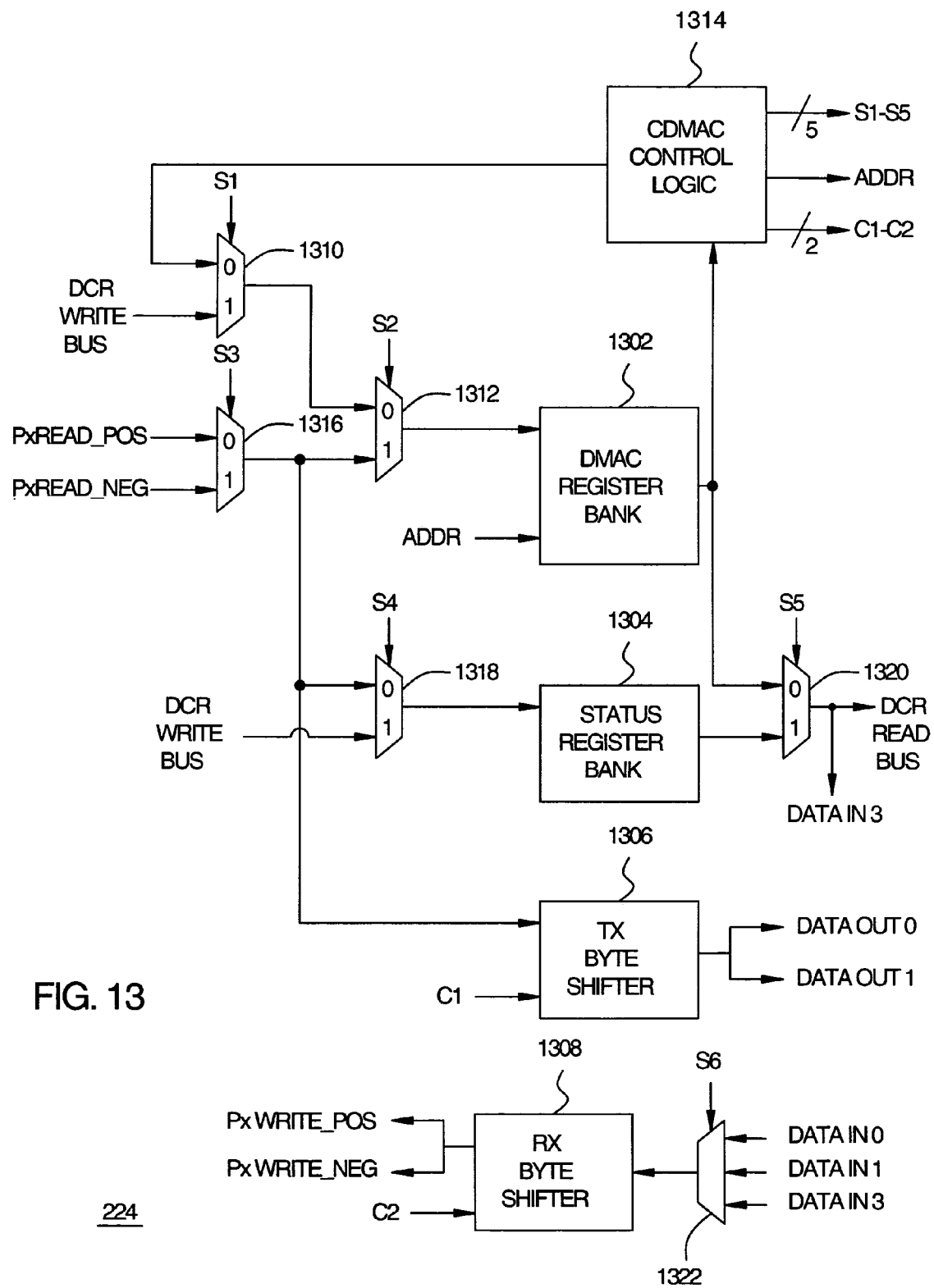
FIG. 13 is a block diagram depicting an exemplary embodiment of a communication direct memory access controller (CDMAC) in accordance with one or more aspects of the invention.

FIG. 13 is a block diagram depicting an exemplary embodiment of a CDMAC 224 of FIGS. 2 and 3 in accordance with one or more aspects of the invention. In the present embodiment, the CDMAC 224 is configured to control two of the ports 222 in the MPMC 204. The CDMAC 224 provides a DMA interface between the ports $222_2$ and $222_3$ and the memory 206. The memory 206 stores a set of descriptors to facilitate DMA operations. The descriptors may be maintained by the CPU 202.

The CDMAC 224 implements two DMA engines 325 for each of the ports $222_2$ and $222_3$, one for transmitting data from the memory 206 to a device (TX engine), and one for receiving data from a device for storage in the memory 206 (RX engine). While the CDMAC 224 is described as implementing four DMA engines for controlling two ports, it is be understood that the CDMAC 224 may control any number of ports present in the MPMC, where two DMA engines are implemented for each port.

The CDMAC 224 comprises a DMA controller (DMAC) register bank 1302, a status register bank 1304, a transmit (TX) byte shifter 1306, a receive (RX) byte shifter 1308, CDMAC control logic 1314, and multiplexers 1310, 1312, 1316, 1318, 1320, and 1322. The DMAC register bank 1302 stores parameters associated with each of the four DMA engines implemented by the CDMAC 224. The status register bank 1304 stores status flags associated with each of the four DMA engines implemented by the CDMAC 224.

One input port of the multiplexer 1310 is configured to receive data from the DCR write bus, and another input port of the multiplexer 1310 is coupled to an output interface of the CDMAC control logic 1314. A selection port of the multiplexer 1310 is configured to receive a signal S1 from the CDMAC control logic 1314. An output port of the multiplexer 1310 is coupled to an input port of the multiplexer 1312.

Input ports of the multiplexer 1316 are respectively configured to receive data from the positive edge read interface and the negative edge read interface for the port selected by the port arbitration logic 306 (Px read_pos and Px read_neg). The Px read_pos and Px read_neg interfaces are part of the data path logic 308, described above, and provide a read interface to the memory 206. A selection port of the multiplexer 1316 is configured to receive a signal S3 from the CDMAC control logic 1314. An output port of the multiplexer 1316 is coupled to another input port of the multiplexer 1312.

The multiplexer 1310 selects the source for one of the input ports of the multiplexer 1312 between the DCR write bus and internal data generated by the CDMAC control logic 1314. The multiplexer 1316 selects the source for the other of the input ports of the multiplexer 1312 between the positive and negative edge read interfaces of the selected port. A selection port of the multiplexer 1312 is configured to receive a signal S2 from the CDMAC control logic 1314. An output port of the multiplexer 1312 is coupled to an input port of the DMAC register bank 1302. The multiplexer 1312 selects the source for the input port of the DMAC register bank 1302 between the output of the multiplexer 1310 and the output of the multiplexer 1316.

An address port of the DMAC register bank 1302 is configured to receive an address signal from the CDMAC control logic 1314. The address signal controls which register in the DMAC register bank 1302 is written to or read from. An output port of the DMAC register bank 1302 is coupled to an input interface of the CDMAC control logic 1314 and an input port of the multiplexer 1320.

Input ports of the multiplexer 1318 are respectively coupled to the DCR write bus and the output port of the multiplexer 1316. A selection port of the multiplexer 1318 is configured to receive a signal S4 from the CDMAC control logic 1314. An output port of the multiplexer 1318 is coupled to an input port of the status register bank 1304. The multiplexer 1318 selects the source for the input port of the status register bank 1304 between the DCR write bus and the output of the multiplexer 1316. An output port of the status register bank 1304 is coupled to another input port of the multiplexer 1320. A selection port of the multiplexer 1320 is configured to receive a signal S5 from the CDMAC control logic 1314. An output port of the multiplexer 1320 is coupled to the DCR read bus and an input port of the multiplexer 1322 (data in 3). The multiplexer 1320 selects an output for the DCR read bus and the data in 3 input of the multiplexer 1322 between the output port of the status register bank 1304 and the DMAC register bank 1302.

An input port of the TX byte shifter is coupled to the output port of the multiplexer 1316. A control interface of the TX byte shifter is configured to receive control signals from the CDMAC control logic 1314. An output port of the TX byte shifter 1306 is configured to provide output data for one of the ports selected by the port arbitration logic 306. Input ports of the multiplexer 1322 are configured to receive input data from the ports controlled by the CDMAC 304. A selection port of the multiplexer 1322 is configured to receive a signal S6 from the CDMAC control logic 1314. An output port of the multiplexer 1322 is coupled to an input port of the RX byte shifter 1308.

The multiplexer 1322 selects the source for the input port of the RX byte shifter 1308 between the data inputs of the controlled ports (data in 0 and data in 1), as well as the output port of the multiplexer 1320 (data in 3). Notably, the contents of the DMAC register bank 1302 and status register bank 1306 may be written by the CDMAC 224 into the memory 206 by selecting the output of the multiplexer 1320 (data in 3) at the multiplexer 1322. A control interface of the RX byte shifter 1308 is configured to receive control signals from the CDMAC control logic 1314. An output port of the RX byte shifter 1308 is configured to provide data to the positive edge write interface and the negative edge read interface for the port selected by the port arbitration logic 306 (Px write_pos and Px write_neg). The Px write_pos and Px write_neg interfaces are part of the data path logic 308, described above, and provide a write interface to the memory 206.

Data may be stored in the DMAC register bank 1302 from the DCR write bus (i.e., the CPU 202 may write data to the DMAC register bank 1302 via the DCR bus), from the memory 206 through the data path logic 308, and from the CDMAC control logic 1314. Data may be read from the DMAC register bank 1302 via the CDMAC control logic 1314 and the DCR read bus (i.e., the CPU 202 may read data from the DMAC register bank 1302 via the DCR bus). Data may be stored in the status register bank 1304 from the DCR write bus and the memory 206 through the data path logic 308. The CDMAC 224 provides data from the memory 206 through the TX byte shifter 1306. The CDMAC 224 stores data in the memory 206 through the RX byte shifter 1306. The TX byte shifter 1306 and the RX byte shifter 1306 are configured to transpose the data written to and read from the memory 206 to a proper byte alignment required by the data input/output interface (e.g., a LocalLink interface). Operation of the CDMAC 224 is described in detail below.

Figure 14:
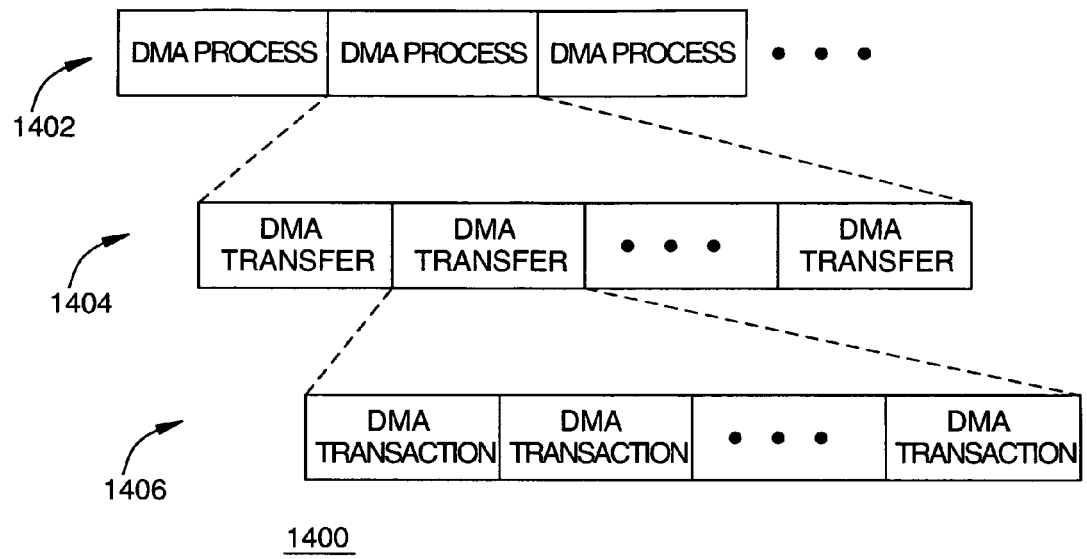
FIG. 14 is diagram depicting a hierarchy of DMA operations performed by the invention.

FIG. 14 is diagram depicting a hierarchy 1400 of DMA operations performed by an embodiment of the invention. A first level 1402 includes a sequence of DMA processes. A DMA process comprises a set of DMA transfers that result in all data corresponding to all descriptors to be transferred. A DMA process is performed by a DMA engine implemented within the CDMAC 224 (e.g., a transmit or a receive engine for any of the controlled ports). There are one or more descriptors stored in the memory 206 and associated with each DMA process. A second level 1404 includes a sequence of DMA transfers for a given DMA process. A DMA transfer comprises a set of DMA transactions that transfers all data corresponding to a single descriptor. A third level 1406 includes a sequence of DMA transactions for a given DMA transfer. A DMA transaction is a single DDR "bus cycle" to transact a particular number of bytes of data (e.g., 128 bytes).

Operational aspects of the CDMAC 224 may be understood with reference to the data communication system 200 of FIG. 2. As discussed above, for each port controlled by the CDMAC 224 (e.g., ports $222_2$ and $222_3$), the CDMAC 224 implements a transmit DMA engine and a receive DMA engine. The transmit DMA engine is responsible for communicating a stream of data between the memory 206 and the device coupled to the associated port (i.e., reading data). For example, the transmit DMA engine $325_3$ for the port $222_3$ is responsible for communicating data from the memory 206 to the MAC 212. The receive DMA engine is responsible for communicating a stream of data between the device coupled to the associated port and the memory 206 (i.e., storing data). For example, the receive DMA engine $325_4$ for the port $222_3$ is responsible for communicating data from the MAC 212 to the memory 206.

As discussed above, the CDMAC 224 communicates with the host interface logic 208 and the MAC 212 via busses 230 and 232, respectively. In one embodiment of the invention, communication over the busses 230 and 232 is implemented using a handshaking protocol (e.g., LocalLink).

Figure 17:
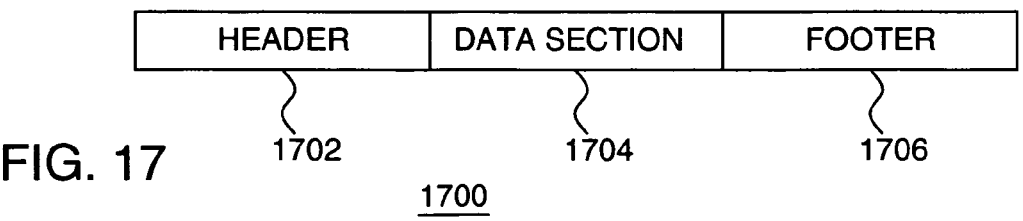
FIG. 17 is a diagram depicting an exemplary communication sequence for communicating information between the CDMAC of FIG. 13 and a device coupled thereto.

FIG. 17 is a diagram depicting an exemplary communication sequence 1700 for communicating information between the CDMAC 224 and a device coupled thereto. The CDMAC 224 broadcasts the communication sequence 1700 across the DMA interface (the controlled ports) to the device. For example, the CDMAC 224 may broadcast the communication sequence 1700 across the port $222_3$ to the MAC 212. The communication sequence 1700 comprises a header 1702, followed by a data section 1704, followed by a footer 1706. The information within the header 1702, the data section 1704, and the footer 1706 depends upon the direction of communication (i.e., from memory to the device or from the device to the memory). A DMA process is associated with each communication operation (transmit or receive).

During a transmit operation (i.e., a read from the memory to the device), the header 1702 includes the first descriptor of the DMA process associated with the transmit operation. This allows the device to receive parameters within the descriptor chain associated with the DMA process. Exemplary parameters within a descriptor are described below. The data section 1704 includes data from the memory 206 that is references by the descriptors in the DMA process. In one embodiment of the invention, the communication sequence 1700 is unidirectional and the information within the footer 1706 is ignored by the device. Thus, the footer 1706 includes an indication that no data is contained therein.

During a receive operation (i.e. a write to the memory from the device), the header 1702 includes the first descriptor of the DMA process associated with the receive operation. This allows the CDMAC 224 to receive parameters within the descriptor chain associated with the DMA process. Exemplary parameters within a descriptor are described below. The data section 1704 includes data from the device that is referenced by the descriptors in the DMA process. The footer 1706 may include various parameters for the information in the data section 1704. For example, the footer 1706 may include a checksum for the information in the data section 1704.

Figure 15:
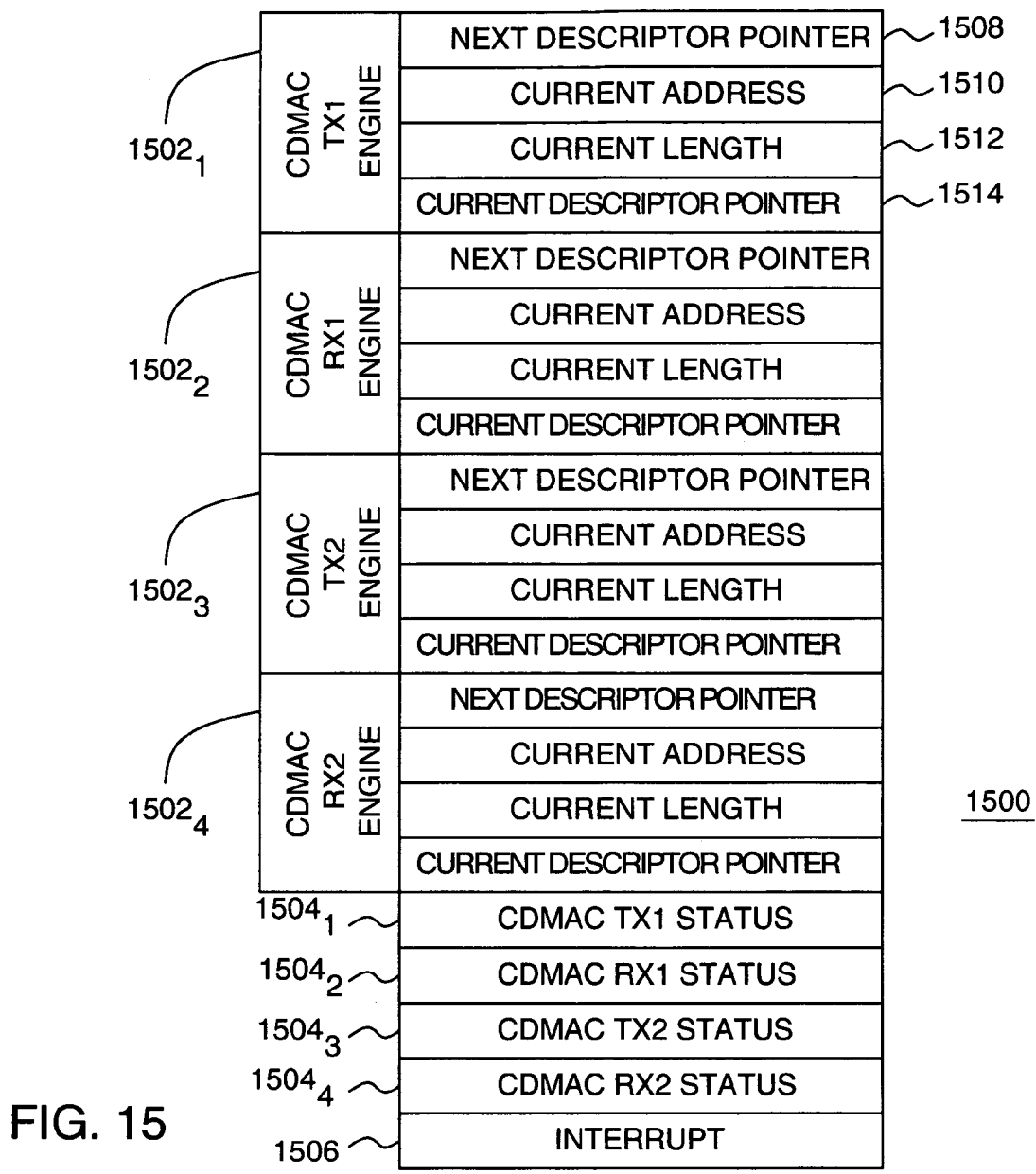
FIG. 15 is diagram depicting an exemplary embodiment of a register model within the CDMAC of FIG. 13.

FIG. 15 is diagram depicting an exemplary embodiment of a CDMAC register model 1500 configured in accordance with the invention. The CDMAC register model 1500 may be implemented using the DMAC register bank 1302 and the status register bank 1304 of the CDMAC 224. The CDMAC register model 1500 includes DMA register sets $1502_1$ through $1502_4$, status registers $1504_1$ through $1504_4$, and an interrupt register 1506. The DMA register sets $1502_1$ through $1502_4$ correspond to a transmit DMA engine for the first controlled port, a receive DMA engine for the first controlled port, a transmit DMA engine for the second controlled port, and a receive DMA engine for the second controlled port, respectively. Each of the DMA register sets $1502_1$ through $1502_4$ includes a next descriptor register 1508, a current address register 1510, a current length register 1512, and a current descriptor register 1514. The CDMAC register model 1500 may be understood with reference to the DMA descriptor model shown in FIG. 16.

Figure 16:
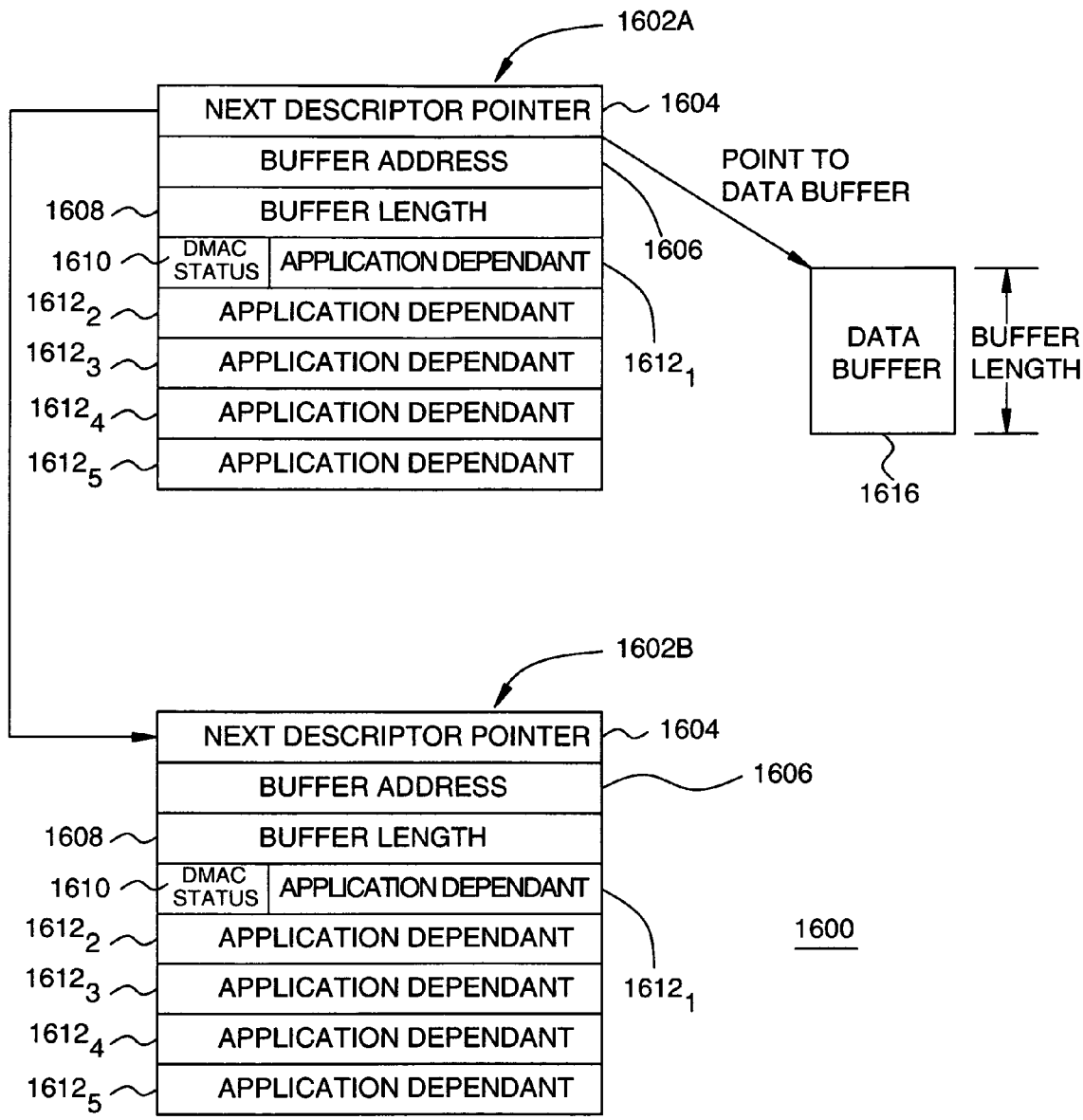
FIG. 16 is a diagram depicting an exemplary embodiment of a DMA descriptor model in accordance with the invention.

FIG. 16 is a diagram depicting an exemplary embodiment of a DMA descriptor model 1600 in accordance with the invention. The DMA descriptor model 1600 comprises one or more descriptors 1602, for example, a chain of descriptors. For purposes of clarity by example, a descriptor 1602A and a descriptor 1602B are shown, where the descriptor 1602B is the last descriptor in a chain. Each of the descriptors 1602A and 1602B include a next descriptor pointer 1604, a buffer address field 1606, a buffer length field 1608, a CDMAC status field 1610, and one or more application dependent fields 1612. Illustratively, five application dependent fields $1612_1$ through $1612_5$ are shown. Each of the descriptor pointer 1604, the buffer address field 1606, the buffer length field 1608, the CDMAC status field 1610, and the application dependent fields $1612_2$ through $1612_5$ may comprise one word in memory (e.g., 32 bits). The CDMAC status field 1610 and the application dependent field $1612_1$ form a single word in memory.

The next descriptor pointer 1604 points to the next descriptor in the chain. In the last descriptor in the chain, the next descriptor pointer 1604 may be a null value to indicate the end of the chain. The buffer address field 1606 defines the start address of a data buffer 1616 (e.g., data stored in the memory 206). The buffer length field 1608 defines the length of the data buffer 1616. The CDMAC status field 1610 contains CDMAC status flags for any given DMA engine implemented by the CDMAC 224. Embodiments of CDMAC status flags are discussed below. The application dependent fields 1612 may be used to store application dependent data. As discussed above, in a communication sequence between the CDMAC 224 and a device, a header is broadcast that contains the first descriptor in the chain, and a footer may be broadcast that contains the last descriptor in the chain. The application dependent fields 1612 may include parameters useful for the device receiving the header and the footer. For example, if the CDMAC 224 is transmitting data to the MAC 212, the application dependent fields 1612 of the first descriptor in the chain may be written by the CDMAC 224 to include an initial checksum value. If the CDMAC 224 is receiving data from the MAC 212, the application dependent fields 1612 of the first descriptor in the chain may include the number of bytes to be stored, and the application dependent fields 1612 of the last descriptor in the chain may include checksum data. Additional information that may be stored in the application dependent fields 1612 with respect to the MAC 212 is discussed below in the section entitled "Gigabit Ethernet MAC."

With simultaneous reference to FIGS. 15 and 16, for each of the DMA register sets 1502, the next descriptor register 1508 is loaded from the value contained in the next descriptor pointer 1604 in the currently pointed-to descriptor. The current descriptor register 1514 maintains the pointer to the descriptor that is currently being processed by the particular DMA engine. The value in the next descriptor register 1508 is held until the given DMA engine has completed the DMA transfer associated with the currently pointed-to descriptor. Once the current DMA transfer is completed, the CDMAC 224 uses the value stored in the next descriptor register 1508 to fetch the next descriptor and begin the next DMA transfer. If the next descriptor register 1508 contains a null value, the associated DMA engine will stop (e.g., the DMA process has terminated).

To start a given DMA engine, a value is written to the current descriptor register 1514. For example, the CPU 202 may start a given DMA engine by writing a value to the current descriptor register 1514. After a DMA transfer is completed (i.e., one descriptor has been processed), the value in the next descriptor register 1508 is copied into the current descriptor register 1514, which restarts the DMA engine.

The current address register 1510 maintains the address in memory where the current DMA transaction is to be conducted. The value in the current address register 1510 is initially loaded when the descriptor is read by the CDMAC 224 for the given DMA engine. Once set, the CDMAC 224 transfers the value stored in the current address register 1510 to an address counter within the CDMAC control logic 1314, which updates the value for each DMA transaction completed. Upon termination of a DMA transaction, the CDMAC 224 will overwrite the value in the current address register 1510 with the new value from the CDMAC control logic 1314. The process continues until the DMA transfer is complete.

The current length register 1512 maintains the remaining length of the data to be transferred by the given DMA engine. The value is initially loaded into the current length register 1512 when the descriptor is read by the CDMAC 224 for the given DMA engine. Once set, the CDMAC 224 transfers the value stored in the current length register 1512 to a length counter in the CDMAC control logic 1314, which updates the value for each DMA transaction completed. Upon termination of a DMA transaction, the CDMAC 224 will overwrite the value in the current length register 1512 with the new value from the CDMAC control logic 1314. The process continues until the DMA transfer is complete. A DMA transfer may terminate if the length of data to be transferred reaches zero (in a transmit case), if an end_of_packet signal is asserted (in a receive case), or if an error occurs in either transmission or reception.

The status registers 1504 contain one or more status flags associated with their respective DMA engines. Each of the status registers 1504 include copies of the flags in the CDMAC status field 1610 within the descriptor that is currently being processed by the respective DMA engine. For each DMA engine, after the descriptor has been fully processed (i.e., the DMA transfer is complete), the flags in the CDMAC status field 1610 of the processed descriptor are updated using values in the respective one of the status registers 1504.

In one embodiment, each of the status registers 1504 may include the following status flags: channel_reset, channel_busy, end_of_packet, start_of_packet, CDMAC_completed, stop_on_end, int_on_end, and CDMAC_error. Each of the status flags may be represented by one bit in the status register 1504. The meaning of each of these exemplary status flags is discussed immediately below.

The channel_reset flag may be used to cause the given DMA engine to enter a known state. For example, the CPU 202 may reset a given DMA engine by writing a '1' to the channel_reset flag. The channel_busy flag may be used to indicate that the given DMA engine is busy (e.g., performing a particular DMA transaction). For example, the CPU 202 may read the channel_busy flag to determine if the associated DMA engine is busy. The CDMAC_error flag may be used to indicate that the CDMAC 224 has encountered an error.

The start_of_packet flag may be used to indicate that the descriptor currently being processed by a given DMA engine is the first descriptor representing the data to be transmitted or received. For example, for the transmit DMA engines, the CPU 202 may set the start_of_packet flag to signal the start of the data to be transmitted. The CPU 202 may set the start_of_packet flag indirectly be including it in the CDMAC status field 1610 of the last descriptor associated with the data. For the receive DMA engines, the CDMAC 224 may set the start_of_packet flag, which may then be read by the CPU 202 to indicate the start of the data to be received. The CPU 202 may read the start_of_packet flag indirectly from the CDMAC status field 1610 of the last descriptor associated with the data.

The end_of_packet flag may be used to indicate that the descriptor currently being processed by a given DMA engine is the final descriptor representing the data to be transmitted or received. For example, for the transmit DMA engines, the CPU 202 may set the end_of_packet flag to signal the end of the data to be transmitted. The CPU 202 may set the end_of_packet flag indirectly by including it in the CDMAC status field 1610 of last descriptor associated with the data. For the receive DMA engines, the CDMAC 224 may set the end_of_packet flag, which may then be read by the CPU 202 to indicate the end of the data to be received. The CPU 202 may read the end_of_packet flag indirectly from the CDMAC status field 1610 of the last descriptor associated with the data.

The CDMAC_completed flag may be used to indicate that a particular DMA engine has transferred all the data defined by the current descriptor. For example, for the transmit DMA engines, the CDMAC 224 will transfer data until the buffer length field 1608 of a descriptor is zero and then set the CDMAC_completed flag. For received DMA engines, the CDMAC 224 will transfer data until the buffer length field 1608 of a descriptor is zero or when a descriptor is processed having the end_of_packet flag set in the CDMAC status field 1610. The CDMAC_completed flag is written back to the current descriptor at the end of the DMA transfer. This allows the CPU 202 to read through the descriptors while the DMA engine is running to see how far the CDMAC 224 has proceeded.

The stop_on_end flag may be used to force a DMA engine in the CDMAC 224 to halt operations when the current descriptor has been processed. For example, the CPU 202 may set the stop_on_end flag in the CDMAC status field 1610 of a descriptor to halt a particular DMA engine in an orderly fashion.

The int_on_end flag may be used to force the CDMAC 224 to interrupt the CPU 202 for a particular DMA engine. For example, the CPU 202 may set the int_on_end flag in the CDMAC status field 1610 of a descriptor to force the CDMAC 224 to interrupt the CPU 202. Notably, the interrupt register 1506 may include a bit representing each of the DMA engines implemented by the CDMAC 224 (e.g., four bits in the present embodiment). If a particular DMA engine detects assertion of the int_on_end flag, the DMA engine sets its respective bit in the interrupt register 1506 upon completion of the current DMA transfer. The CDMAC 224 will interrupt the CPU 202 if any of the bits in the interrupt register 1506 are set. The interrupt register 1506 may also include a master interrupt enable bit that, if unset, will prevent the CDMAC 224 from interrupting the CPU 202 regardless of requests from the DMA engines.

The stop_on_end and int_on_end flags are independent of one another. Thus, there are four possible operations with respect to the two flags: a DMA engine can be made to halt upon completion of the current descriptor without interrupting the CPU 202; a DMA engine can be made to halt upon completion of the current description and interrupt the CPU 202; a DMA engine can be made to interrupt the CPU 202 while proceeding to process the next descriptor (if there is one); and a DMA engine can process the next descriptor (if there is one) without halting or interrupting the CPU 202.

Figure 18:
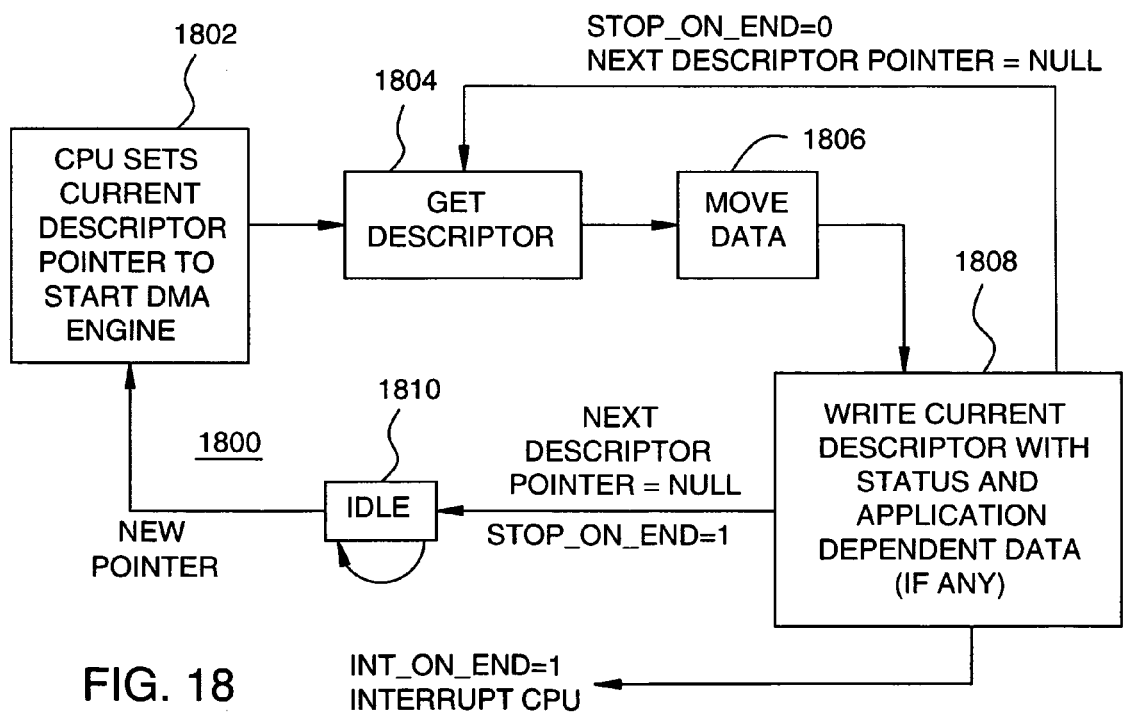
FIG. 18 is a state diagram depicting a process of operation of a DMA engine implemented within the CDMAC of FIG. 13.

FIG. 18 is a state diagram depicting a process 1800 of operation of a DMA engine implemented within the CDMAC 224. The process 1800 may be understood with reference to FIGS. 15 and 16, described above. In the present example, operation of a transmit DMA engine associated with the DMA register set 1502$_1$ is considered. It is to be understood, however, that each DMA engine implemented by the CDMAC 224 operates similarly. The process 1800 begins at a state 1802, where the CPU 202 (also referred to as a central processing unit (CPU)) sets loads the current descriptor register 1514 of the DMA register set 1502$_1$.

The process 1800 proceeds to state 1804, where the DMA engine retrieves a descriptor pointed-to by the current descriptor register 1514 from memory. The process 1800 proceeds state 1806, where the DMA engine executes a DMA transfer (i.e., data is moved). The process 1800 proceeds to a state 1808, where the CDMAC status field 1610 of the current descriptor is updated with information from the status register 1504$_1$. In addition, the application dependent fields 1612 may be updated, if desired.

If the stop_on_end flag in the status register 1504$_1$ is not set, and if the next descriptor register 1508 does not contain a NULL value, the process 1800 returns to the state 1804. In addition, if the int_on_end flat is set, the DMA engine requests an interrupt of the CPU 202. If the stop_on_end flag in the status register 1504$_1$ is set, or if the next descriptor register 1508 contains a NULL value, the process 1800 proceeds to state 1810. The state 1810 is an idle state. The process 1800 proceeds from the state 1810 if the CPU 202 writes a new pointer to the current descriptor register 1514, and the process 1800 repeats. In one embodiment, the DMA engine may be configured to receive a channel reset command, in which case the process 1800 proceeds from any one of the current states to the idle state 1810.

Gigabit Ethernet MAC

Figure 19:
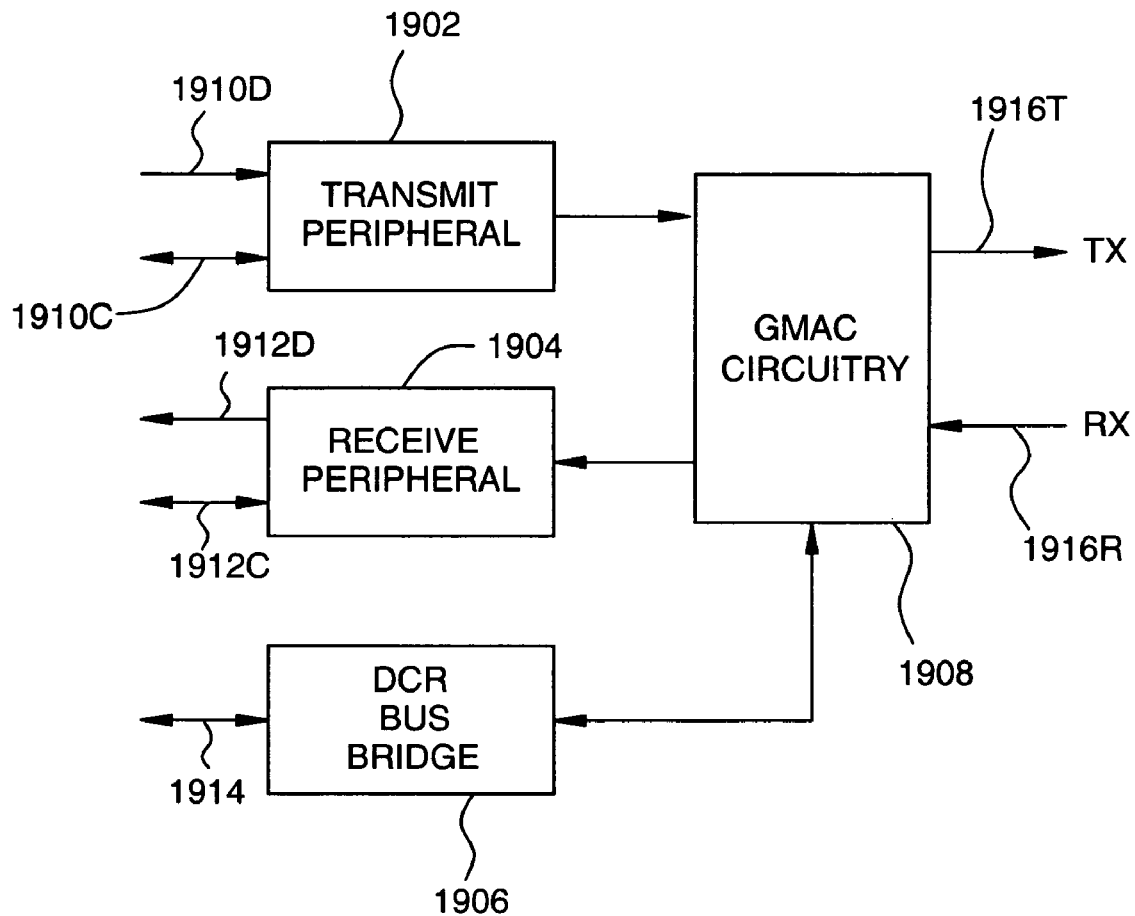
FIG. 19 is a block diagram depicting an exemplary embodiment of a Gigabit Ethernet media access controller (GEMAC) constructed in accordance with the invention.

FIG. 19 is a block diagram depicting an exemplary embodiment of the MAC 212 of FIG. 2 constructed in accordance with the invention. Aspects of the MAC 212 may be understood with reference to the data communication system 200 of FIG. 2. In the present embodiment, the MAC 212 is configured to communicate using the Gigabit Ethernet protocol. That is, the MAC 212 processes Gigabit Ethernet frames ("frames"). The frames may include various data that is to be communicated between the host device 210 and the network transceiver logic 214. For example, the frames may encapsulate TCP/IP packets that carry the data to be communicated.

The CPU 202 may execute software stored in the memory 206 to implement a TCP/IP stack. For each frame to be transmitted, the CPU 202 will establish a chain of descriptors for use by the CDMAC 224 to retrieve the frame from memory and transmit the frame to the MAC 212. For each frame received, the CPU 202 will establish a chain of descriptors for use by the CDMAC 224 to receive the frame from the MAC 212 and store the frame in memory. Operation of the CDMAC 224 is discussed above, along with exemplary descriptor models.

The MAC 212 comprises a transmit peripheral 1902, a receive peripheral 1904, a DCR bus bridge 1906, and gigabit MAC (GMAC) circuitry 1908. The transmit peripheral 1902 includes an interface 1910 comprising a data interface 1910D and a control interface 1910C. The receive peripheral 1904 includes an interface 1912 comprising a data interface 1912D and a control interface 1912C. The DCR bus bridge 1906 includes an interface 1914. The interface 1914 may comprise a conventional DCR interface, the details of which are well known in the art.

The interfaces 1910 and 1912 comprise streaming interfaces. In one embodiment of the invention, the interfaces 1910 and 1912 comprise LocalLink interfaces. The interface 1910 of the transmit peripheral 1902 is configured to receive a data stream from a DMA engine. For example, with reference to FIG. 2, the interface 1910 is coupled to the CDMAC 224, which is coupled to the ports 222$_2$ and 222$_3$. As described above, the MAC 212 is associated with the port 222$_3$, and the CDMAC 224 implements a transmit DMA engine 325$_3$ and a receive DMA engine 325$_4$ for the port 222$_3$. Using the transmit DMA engine 325$_3$, the transmit peripheral 1902 may read frames from the memory 206. The interface 1912 of the receive peripheral 1904 is configured to transmit a data stream to a DMA engine. In the above example, the interface 1912 is coupled to the CDMAC 224. Using the receive DMA engine 325$_4$, the receive peripheral 1904 may write frames to the memory 206.

An output interface of the transmit peripheral 1902 is coupled to an input interface the GMAC circuitry 1908. An input interface of the receive peripheral 1904 is coupled to an output interface of the GMAC circuitry 1908. A control interface of the GMAC circuitry 1908 is coupled to an interface of the DCR bus bridge 1906. The GMAC circuitry 1908 includes an interface 1916 comprising a transmit interface 1916T and a receive interface 1916R. The GMAC circuitry 1908 receives and transmits data in accordance with the Gigabit Ethernet protocol. Circuitry for communicating data in accordance with the Gigabit Ethernet protocol is well known in the art. The CPU 202 may control the GMAC circuitry 1908 using the DCR bus through the DCR bus bridge 1906.

Figure 20:
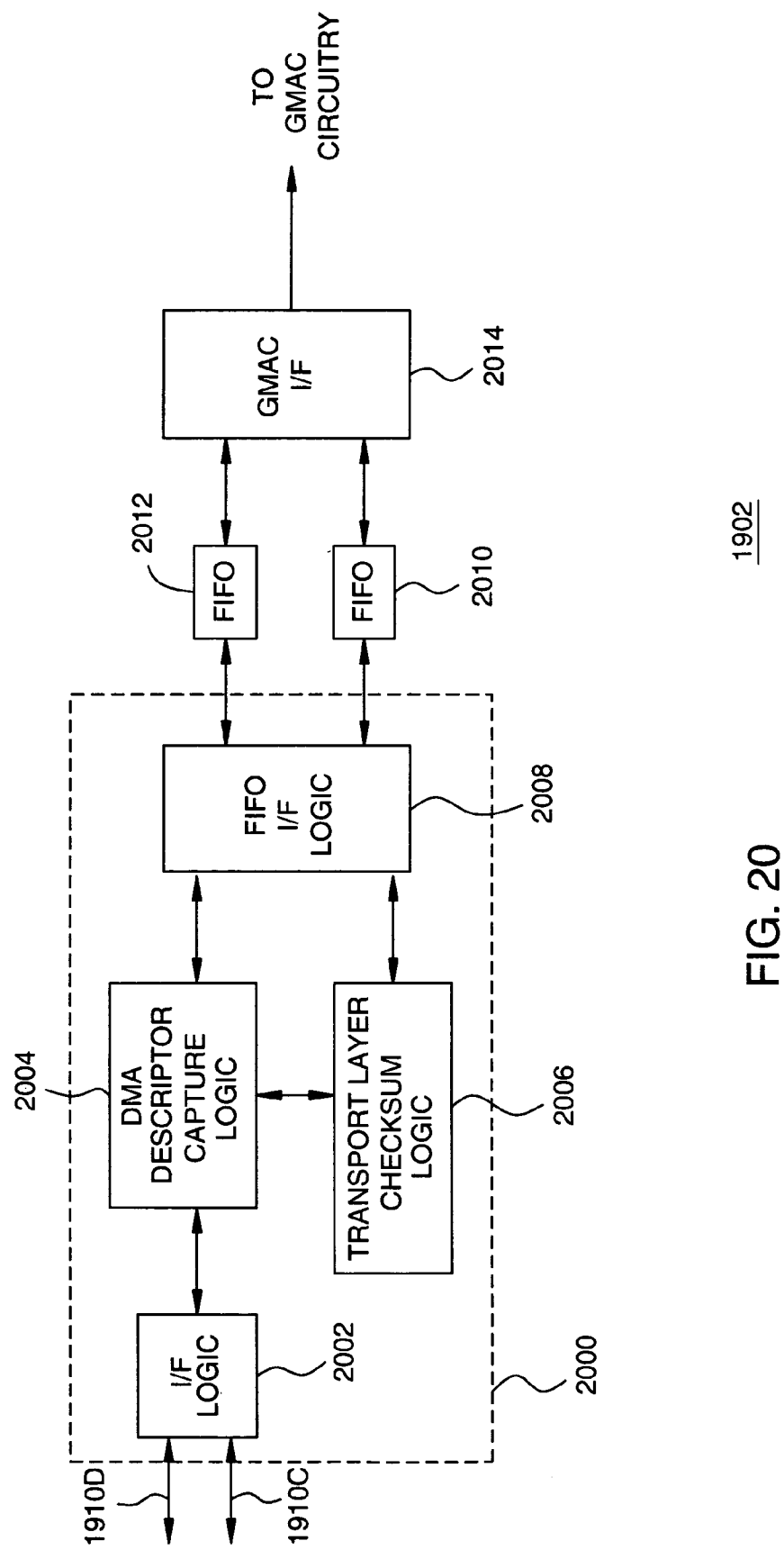
FIG. 20 is a block diagram depicting an exemplary embodiment of a transmit peripheral within the GEMAC of FIG. 19.

FIG. 20 is a block diagram depicting an exemplary embodiment of the transmit peripheral 1902 of FIG. 19 constructed in accordance with the invention. The transmit peripheral 1902 comprises interface/control logic 2000, a FIFO 2012, a FIFO 2010, and GMAC interface logic 2014. The interface/control logic 2000 comprises interface logic 2002, DMA descriptor capture logic 2004, transport layer (e.g., TCP or user datagram protocol (UDP)) checksum logic 2006, and FIFO interface logic 2008.

Ports of the interface logic 2002 communicate with the interface 1910. Another port of the interface logic 2002 is coupled to the DMA descriptor capture logic 2004 and the transport layer checksum logic 2006. The interface logic 2002 provides an interface between the interface 1910 (e.g., LocalLink) and the DMA descriptor capture logic 2004/transport layer checksum logic 2006. Ports of the DMA descriptor capture logic 2004 and the transport layer checksum logic 2006 are respectively coupled to the FIFO interface logic 2008. The DMA descriptor capture logic 2004 is configured to extract descriptor information from a data stream provided by the interface logic 2002. The transport layer checksum logic 2006 is configured to compute TCP checksum data for frames within a data stream provided by the interface 2002. The DMA descriptor capture logic 2004 provides control information to the transport layer checksum logic 2006.

Ports of the FIFO interface logic 2008 are respectively coupled to the FIFO 2012 and the FIFO 2010. The FIFO interface logic 2008 provides an interface between the DMA descriptor logic 2004/TCP checksum logic 2006 and the FIFOs 2012 and 2010. Ports of the FIFO 2012 and the FIFO 2010 are coupled to the GMAC interface 2014. The FIFO 2010 is configured to store frames. The FIFO 2012 is configured to store checksum data for the frames in the FIFO 2010. A port of the GMAC interface 2014 is coupled to the GMAC circuitry 1908. The GMAC interface 2014 provides an interface between the FIFOs 2010 and 2012 and the GMAC circuitry 1908.

Figure 21:
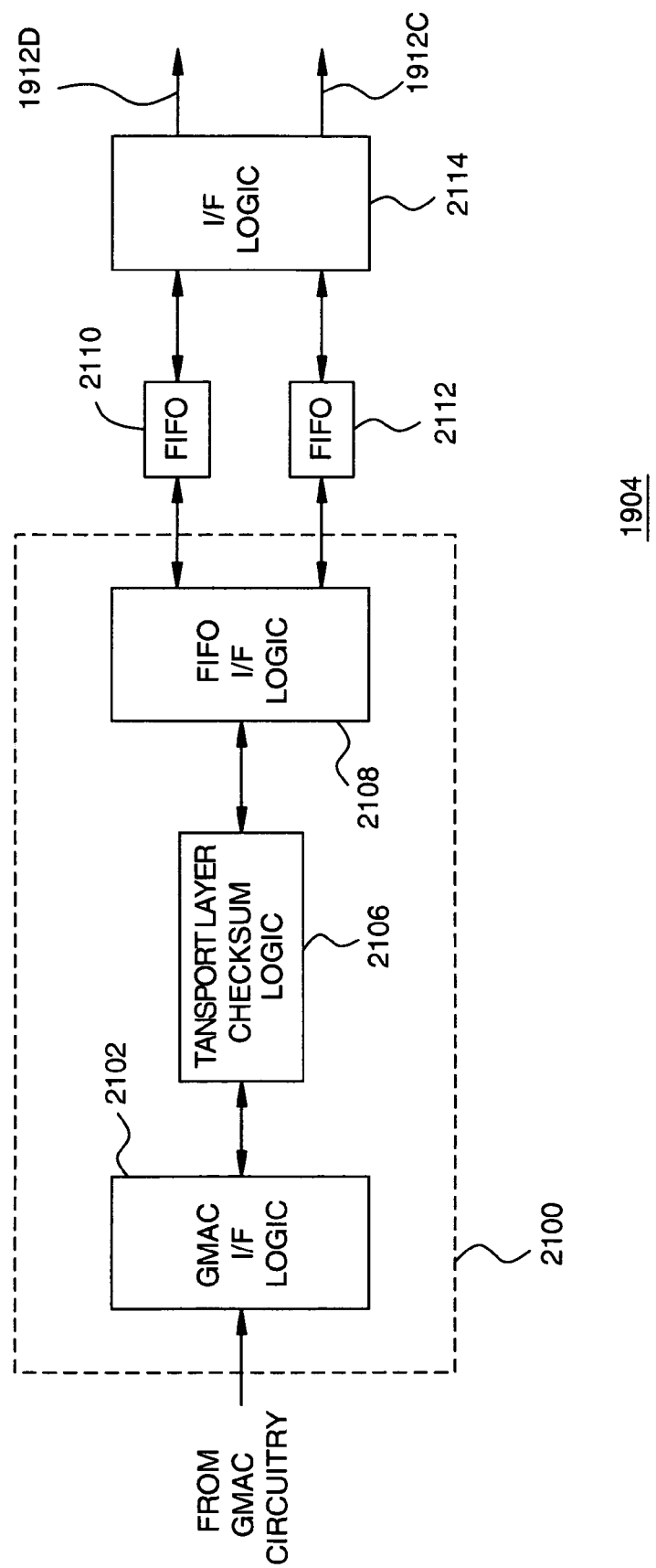
FIG. 21 is a block diagram depicting an exemplary embodiment of a receive peripheral within the GEMAC of FIG. 19.

FIG. 21 is a block diagram depicting an exemplary embodiment of the receive peripheral 1904 of FIG. 19 constructed in accordance with the invention. The receive peripheral 1904 comprises GMAC interface/control logic 2100, a FIFO 2112, a FIFO 2110, and interface logic 2114. The GMAC interface/control logic 2100 comprises GMAC interface logic 2102, transport layer checksum logic 2106, and FIFO interface logic 2108.

An input port of the GMAC interface logic 2102 is coupled to the GMAC circuitry 1908. A port of the GMAC interface logic 2102 is coupled to the transport layer checksum logic 2106. The GMAC interface logic 2102 provides an interface between the GMAC circuitry 1908 and the transport layer checksum logic 2106. A port of the transport layer checksum logic 2106 is coupled to the FIFO interface logic 2108. The transport layer checksum logic 2106 is configured to compute TCP or UDP checksum data for received frames.

Ports of the FIFO interface logic 2108 are respectively coupled to the FIFO 2112 and the FIFO 2110. The FIFO interface logic 2108 provides an interface between the transport layer checksum logic 2106 and the FIFOs 2110 and 2112. Ports of the FIFO 2112 and the FIFO 2110 are coupled to the interface logic 2114. The FIFO 2110 is configured to store received frames. The FIFO 2112 is configured to store checksum data for the received frames in the FIFO 2010. Additional ports of the interface logic 2114 are configured for communication with the interface 1912. The interface logic 2114 provides an interface between the FIFOs 2110 and 2112 and the interface 1912 (e.g., LocalLink interface).

Referring to FIGS. 19-21, the data stream communicated between the MAC 212 and the CDMAC 224 may include a communication sequence as described above with respect to FIG. 17 (i.e., a communication sequence having a header, a data section, and a footer). The software interface to the transport layer checksum logic 2006 of the transmit peripheral 1902 is through descriptors passed from the DMA engine in communication with the interface 1910. A first descriptor in a descriptor chain associated with the frame to be transmitted may be passed from the DMA engine to the transmit peripheral 1902 within the header of the communication sequence. The actual frame to be transmitted is passed in the data section of the streaming interface communication sequence. The last descriptor in the chain may be passed in the footer of the streaming interface communication sequence. However, it is not required that the transmit peripheral 1902 process the footer.

The first descriptor may include various control information for the transmit peripheral 1902. The control information may be extracted from the first descriptor using the DMA descriptor logic 2004. For example, the first descriptor may include frame control data, checksum start offset data, checksum insert offset data, and checksum initial value data. The checksum start offset data provides indication in bytes where the checksum calculation starts within the frame. The checksum insert offset data provides an indication in bytes where the resulting checksum computed by the TCP checksum logic 2006 is inserted from the start of the frame. The checksum initial value data provides a checksum of pseudo header and transport layer header information. These control data may be provided to the transport layer checksum logic 2006 for computing the checksum value for the frame.

The software interface to the receive peripheral 1904 is through descriptors passed from the DMA engine in communication with the interface 1912. A first descriptor in a descriptor chain associated with the received frame may be passed from the receive peripheral 1904 to the DMA engine within the header of the streaming interface communication sequence. The actual received frame is passed in the data section of the streaming interface communication sequence. The last descriptor in the chain may be passed in the footer of the communication sequence.

The first and last descriptors may include various control information generated for the CDMAC 224 by the receive peripheral 1904. For example, the first descriptor may include frame length data. The frame length data provides the length of the receive frame in bytes. The last descriptor may include checksum data. The checksum data provides a checksum value for the received frame.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

The invention claimed is:

1. Apparatus for controlling direct access to memory circuitry by a device, comprising:
   a streaming interface configured to transmit and receive a communication sequence to and from said device, said streaming interface being a non-shared interface to said memory circuitry;
   control logic configured to implement a plurality of direct memory access (DMA) engines configured to read and write data to and from said memory circuitry; and
   a set of registers configured to store control data for said plurality of DMA engines.

2. The apparatus of claim 1, wherein said communication sequence comprises a header, a data section, and a footer.

3. The apparatus of claim 2, wherein at least one of said header and said footer includes at least a portion of said control data.

4. The apparatus of claim 1, wherein each of said plurality of DMA engines is configured to read and write said data by processing at least one chain of descriptors, each said at least one chain having at least one descriptor.

5. The apparatus of claim 4, wherein said set of registers comprises, for each of said plurality of DMA engines:
   a current descriptor register configured to store a pointer to a descriptor currently processed;
   a next descriptor register configured to store a pointer to a descriptor subsequently processed;
   a current address register configured to store an address in said memory circuitry associated with a read or write transaction; and
   a current length register configured to store a length of data to be read from or written to said memory circuitry.

6. The apparatus of claim 5, wherein each of said plurality of DMA engines is configured to read or write data in response to said current descriptor register receiving a value.

7. The apparatus of claim 4, wherein said set of registers comprises, for each of said plurality of DMA engines:
   a status register for storing one or more status flags.

8. The apparatus of claim 4, wherein said set of registers includes an interrupt register, and wherein said control logic is configured to generate an interrupt signal in response to information stored in said interrupt register.

9. The apparatus of claim 1, wherein said memory circuitry comprises double data-rate (DDR) memory circuitry.

10. The apparatus of claim 9, wherein said memory circuitry comprises DDR synchronous dynamic random access memory (SDRAM).

11. A method of controlling direct access to memory circuitry by a device, comprising:
    storing control data for direct memory access (DMA) engines;
    reading data from said memory circuitry using at least one DMA engine of said DMA engines in response to said control data; and
    transmitting a communication sequence to said device over a streaming interface, said communication sequence including said data, said streaming interface being a non-shared interface to said memory circuitry.

12. The method of claim 11, wherein said communication sequence comprises a header, a data section, and a footer.

13. The method of claim 12, wherein at least one of said header and said footer includes at least a portion of said control data.

14. The method of claim 11, further comprising:
    forming, for each said at least one DMA engine, a chain of descriptors having at least one descriptor.

15. The method of claim 14, wherein said control data comprises, for each said at least one DMA engine, a pointer to a first descriptor in said chain of descriptors, a next descriptor in said chain of descriptors, an address in said memory circuitry associated with a read transaction, and a length of data to be read from said memory circuitry.

16. The method of claim 15, wherein said step of reading from said memory is performed in response to said pointer to said first descriptor for each said at least one DMA engine.

17. The method of claim 15, wherein said control data further comprises, for each said at least one DMA engine, status data having one or more status flags.

18. The method of claim 15, wherein said control data further comprises interrupt data.

19. The method of claim 18, further comprising:
    interrupting a processor in response to said interrupt data.

20. A method of controlling direct access to memory circuitry by a device, comprising:
    receiving a communication sequence from said device over a streaming interface, said communication sequence including data to be written to said memory circuitry, said streaming interface being a non-shared interface to said memory circuitry;
    storing control data for direct memory access (DMA) engines; and
    writing said data to said memory circuitry using at least one DMA engine of said DMA engines in response to said control data.

21. The method of claim 20, wherein said communication sequence comprises a header, a data section, and a footer.

22. The method of claim 21, wherein at least one of said header and said footer includes at least a portion of said control data.

23. The method of claim 21, further comprising:
    forming, for each said at least one DMA engine, a chain of descriptors having at least one descriptor.

24. The method of claim 23, wherein said control data comprises, for each said at least one DMA engine, a pointer to a first descriptor in said chain of descriptors, a next descriptor in said chain of descriptors, an address in said memory circuitry associated with a write transaction, and a length of data to be written to said memory circuitry.

25. The method of claim 24, wherein said step of writing to said memory is performed in response to said pointer to said first descriptor for each said at least one DMA engine.

26. The method of claim 24, wherein said control data further comprises, for each said at least one DMA engine, status data having one or more status flags.

27. The method of claim 24, wherein said control data further comprises interrupt data.

28. The method of claim 27, further comprising:
interrupting a processor in response to said interrupt data.

29. A data processing system, comprising:
a processor;
memory circuitry;
a peripheral device; and
a direct memory access (DMA) controller, comprising:
   a streaming interface configured to transmit and receive a communication sequence to and from said peripheral device, said streaming interface being a non-shared interface to said memory circuitry;
   control logic configured to implement a plurality of direct memory access (DMA) engines configured to read and write data to and from said memory circuitry; and
   a set of registers configured to store control data for said plurality of DMA engines.

30. The system of claim 29, wherein said communication sequence comprises a header, a data section, and a footer.

31. The system of claim 30, wherein at least one of said header and said footer includes at least a portion of said control data.

32. The system of claim 29, wherein said processor is configured to store at least one chain of descriptors in said memory circuitry, each said at least one chain having at least one descriptor, and wherein each of said plurality of DMA engines is configured to read and write said data by processing said at least one chain of descriptors.

33. The system of claim 29, wherein said memory circuitry comprises double data-rate (DDR) memory circuitry.

34. The system of claim 33, wherein said memory circuitry comprises DDR synchronous dynamic random access memory (SDRAM).

35. The system of claim 29, wherein said DMA controller is disposed within an integrated circuit.

36. The system of claim 35, wherein said integrated circuit comprises a programmable logic device, and wherein said DMA controller is implemented using programmable logic of said programmable logic device.

\* \* \* \* \*